US012368702B2

United States Patent
Lin et al.

(10) Patent No.: US 12,368,702 B2
(45) Date of Patent: Jul. 22, 2025

(54) INTENT-BASED IDENTITY ACCESS MANAGEMENT SYSTEMS AND METHODS

(71) Applicant: Level 3 Communications, LLC, Broomfield, CO (US)

(72) Inventors: Jamie Lin, St. Louis, MO (US); Vishal Vallabha, Mount Juliet, TN (US); John T. Pugaczewski, Hugo, MN (US); Christopher Buzzetta, Highlands Ranch, CO (US); Glenn Balanoff, Arvada, CO (US); John Knies, Evansville, IN (US); Sylvan H. Morley, III, Thornton, CO (US); Jason Lish, Phoenix, AZ (US)

(73) Assignee: Level 3 Communications, LLC, Denver, CO (US)

( * ) Notice: Subject to any disclaimer, the term of this patent is extended or adjusted under 35 U.S.C. 154(b) by 230 days.

(21) Appl. No.: 18/324,301

(22) Filed: May 26, 2023

(65) Prior Publication Data

US 2023/0388282 A1 Nov. 30, 2023

Related U.S. Application Data

(60) Provisional application No. 63/365,374, filed on May 26, 2022.

(51) Int. Cl.
*H04L 9/40* (2022.01)
(52) U.S. Cl.
CPC ........ *H04L 63/0807* (2013.01); *H04L 63/102* (2013.01); *H04L 63/20* (2013.01)

(58) Field of Classification Search
CPC ... H04L 63/0807; H04L 63/102; H04L 63/20; G06F 21/604; G06F 21/629
See application file for complete search history.

(56) References Cited

U.S. PATENT DOCUMENTS

| | | | |
|---|---|---|---|
| 2019/0098055 A1 | 3/2019 | Pitre | |
| 2019/0327224 A1* | 10/2019 | Zhang | H04L 63/101 |
| 2020/0026871 A1 | 1/2020 | Mikhailov | |
| 2020/0145421 A1* | 5/2020 | Tin | H04L 9/0866 |
| 2022/0309177 A1* | 9/2022 | Mikhailov | G06F 21/6218 |
| 2023/0075296 A1* | 3/2023 | Morley, III | H04L 63/0807 |

OTHER PUBLICATIONS

International Search Report and Written Opinion of the International Searching Authority, dated Sep. 27, 2023, Int'l Appl. No. PCT/US2023/067526, Int'l Filing Date May 26, 2023; 10 pgs.

* cited by examiner

*Primary Examiner* — Baotran N To

(57) ABSTRACT

An identity and access management system including: a processor; and memory including instructions that, when executed by the processor, cause the processor to: receive an API token request for an authorization token to authorize an application function associated with a target API of an application; determine identity information from the API token request; retrieve attributes associated with the identity information; identify the target API and an API function profile associated with the target API for the application function; filter the attributes associated with the identity information based on the API function profile; generate the authorization token according to the filtered attributes; and transmit the authorization token in response to the API token request.

14 Claims, 10 Drawing Sheets

INTENT-BASED IDENTITY ACCESS MANAGEMENT SYSTEMS AND METHODS

CROSS-REFERENCE TO RELATED APPLICATIONS

This application claims the benefit of U.S. Provisional Application No. 63/365,374 filed May 26, 2022, entitled "Intent-Based Identity Access Management Systems and Methods," which is incorporated herein by reference in its entirety.

BACKGROUND

Aspects of one or more embodiments of the present disclosure relate to identity and access management systems, and more particularly, to systems and methods of dynamic authorization management.

Identity and access management (IAM) systems enable organizations to control user access to critical information within the organizations. For example, IAM systems typically require the integration of various disparate systems to enable a single seamless login capability focused on identity, authentication, and authorization, which may each use a complex set of requirements including, for example, accurate contact data, business relationships, multi-factor authentication, least privilege access authorities, device identity, single sign-on token management, and/or the like.

While authentication (or in other words, determining whether a user is who he/she claims to be) may be well implemented, authorization (or in other words, defining what the user can do within the system once authenticated) may be less dynamic. For example, because lack of authorization may hinder a user's job, more authorization than needed may typically be provided. Moreover, because IAM systems may be focused on minimizing or reducing integration, process-heavy management of people and authorization may be required. Thus, an organization may be faced with choosing between complex authorization management that may be less dynamic and prone to errors, or avoiding the use of least privilege access, which may increase risks to the organization.

The above information disclosed in this Background section is for enhancement of understanding of the background of the present disclosure, and therefore, it may contain information that does not constitute prior art.

SUMMARY

One or more embodiments of the preset disclosure are directed to an identity and access management system (IAM) to provide dynamic role-based access control for a plurality of applications.

One or more embodiments of the present disclosure are directed to a method of providing dynamic role-based access control for a plurality of applications.

One or more embodiments of the present disclosure are directed to an IAM system to provide dynamic intent-based access control between a plurality of applications.

One or more embodiments of the present disclosure are directed to a method of providing dynamic intent-based access control between a plurality of applications.

BRIEF DESCRIPTION OF THE DRAWINGS

The above and other aspects and features of the present disclosure will be more clearly understood from the following detailed description of the illustrative, non-limiting example embodiments with reference to the accompanying drawings.

DETAILED DESCRIPTION

Figure 1:
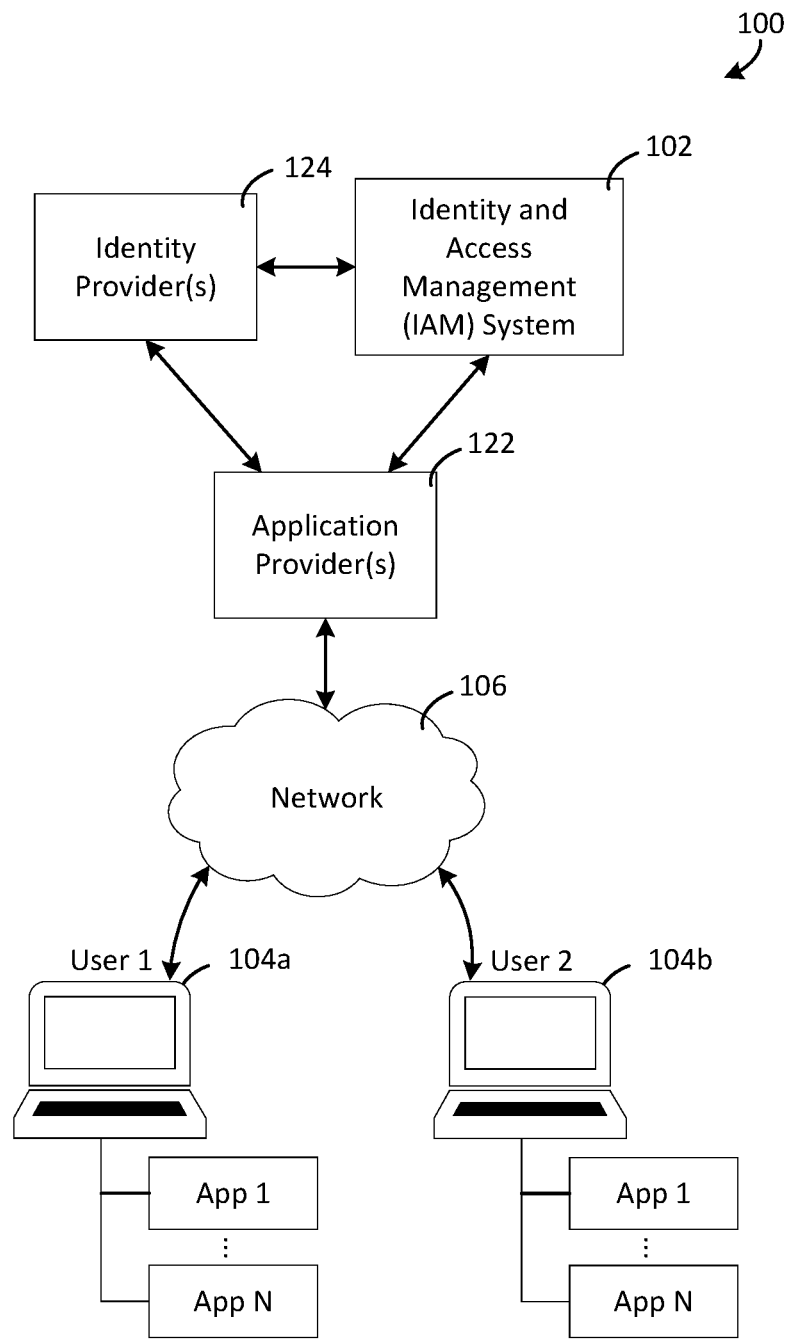
FIG. 1 illustrates an environment of an identity and access management system according to one or more embodiments of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

Generally, authorization may pose various complexities in an IAM system, as a multitude of applications and systems may exist in a modern organization, each with its own permissions and access levels. Thus, simple duplication of user rights or general groupings of user rights have become the norm, such that each user's correct access rights to each of the applications may be rarely managed well. However, when providing authorization, the smallest amount of privilege required to do a job may be desired for security purposes, so this lack of individual access rights management may increase the security risks to the organization. In addition, the lack of individual access rights management may not provide the flexibility desired for the applications and systems to adapt more granularly to business roles, which may result in localized and distributed authorization among them, and/or the inability to properly secure or scale authentication according to the level of access needed or desired. Moreover, with the shift to massively distributed workforces, the popularity of zero trust frameworks may add further complexities in determining if and how much authorization should be granted, for example, such as the device being used or the location of the requested access. This may exponentially increase the complexities of authorization policy management for effectively securing and managing an infrastructure.

According to one or more embodiments of the present disclosure, authorization for a user may be dynamically tailored per application, rather than globally managed by an administrator (e.g., such as an information technology (IT) professional of the organization) using group type authorization schemes that are mapped to local business roles individually managed by the applications. For example, in some embodiments, the IAM system may generate a suitable authorization token (or authorization token information) to enable a user to login to an application with suitable permissions and access levels. The authorization token may be dynamically generated based on various user attributes, access boundaries of various application functions, and/or the like, which may be centrally managed by the IAM system.

In some embodiments, the access boundaries of the various application functions may be defined by the applications based on business roles, business goals, business policies, and/or other rules and requirements provided by the applications to enable various application functions when certain user attributes are present. Accordingly, the IAM system may provide a suitable interface (e.g., an Application Programming Interface (API)) for the applications to define the inputs expected in the authorization token to enable certain application functions, which may be tied to various user attributes and contact information, such that the authorization token may be properly formatted for the application to understand and enable the proper permissions and access levels for the user. Thus, in some embodiments, the resulting authorization token may have a relatively smaller payload by reducing the amount of unnecessary information for the application to process.

In some embodiments, the user attributes and various other contact information used to generate the authorization tokens may be stored in a centralized data store (e.g., a contacts master data management (MDM) service) managed by the IAM system that is accessible by the applications on demand. Accordingly, instead of each of the applications managing its own user attributes and contact information, which may not be shared with other applications, the centralized data store may be a source of ground truth for all the user attributes and contact information used by each of the applications subscribed to the centralized data store to drive the authorizations for the applications. By using the centralized data store as a source of ground truth for holistic user data (e.g., user attributes and contact information), the operational reliability of modern data environments may be leveraged, while creating flexibility in the source of truth for the user data.

In some embodiments, the user attributes and contact information may be stored in a general data format to be used by multiple different applications, rather than being locked into a specific set of fields or attributes, such that it may be replaced over time without changing front-end components of the authentication and authorization services. For example, in some embodiments, no specific data structures may be defined, which may allow for complex relationships to be mapped in the centralized data store that may be optionally used to make downstream authentication and authorization decisions. Thus, instead of a single level of hierarchy of the user data (e.g., the user attributes and contact information), complex parent/child relationships, groupings, and/or references to expandable sub-groups may be implemented to improve or maximize flexibility. Moreover, in some embodiments, centralizing the user data may allow for seamless integration to future systems with lightweight code to standard software data mechanisms, for example, such as JSON on a pub/sub bus, JSON returned from REST APIs, SQL, and/or the like.

In some embodiments, authentication may be scaled as needed or desired in order to dynamically provide suitable authorizations to a user. For example, in some embodiments, the IAM system may couple a username/password authentication mechanism with more complex multi-factor authentication (MFA) mechanisms, for example, such as client-based push notifications, hard or soft token one time passwords (TOTP), smart cards, biometrics, or any other suitable authentication mechanism. Authentication may then be used downstream to set authorization policies and access levels, based on the authentication mechanism used, and redundancy may be created to add flexibility. For example, if a user is authenticated without an appropriate authentication mechanism for a particular application or for enabling a particular application function within the application, the IAM system may require the user to provide the appropriate authentication mechanism before being authorized with suitable permissions or access levels to use the particular application.

In some embodiments, the permissions or access levels of a user for a particular application may be dynamically modified by the IAM system as needed or desired (e.g., per access request, upon the occurrence of an event, and/or the like). For example, in some embodiments, the permissions or access levels granted to a user for a particular application may be time-limited according to one or more of the user attributes and/or the occurrence of an event. As a non-limiting example, a user may be tagged with an attribute (e.g., a role attribute) indicating that the user is a product deployment engineer, and thus, may need super user permissions for a particular application during a production deployment event, but not as much permissions at other times. In this example, the IAM system may be communicably connected to a global change request system to identify change requests corresponding to production deployment times that may affect the particular application, and may modify the user's access levels for the particular application for a suitable duration at the production deployment times. As another example, the access levels granted to a user for a particular application may be dynamically modified based on a security event, for example, such as when the organization is under a current threat or attack. In this case, the IAM system may limit access rights to applications and systems for all or some of the users in order to reduce risks to the organization until the threat or attack has dissipated.

In some embodiments, the IAM system may include an artificial intelligence (AI) policy engine that uses a supervised machine learning model to determine and dynamically adjust the user's permissions and access levels as appropriate. For example, the number of attributes that define the user, the applications accessed by the user, the device that the user is using, and where the user is located may be some of the factors used to train models that determine whether authorization should be permitted or not. The recommendations and actions provided by the AI policy engine may then be verified by a human policy engine (e.g., a human verification policy engine), insuring that such recommendations and actions are appropriate and correct, while enabling the AI policy engine to continuously reinforce and train itself based on a constantly verified training set.

Through this combination of quick-AI decision making with human supervision, the authentication mechanism used, and the source of ground truth for the user attributes and contact information, full complexity of rich security privilege may be brought forward for an application, without the sizable overhead to pre-approval for access. Accordingly, in some embodiments, access to an application may be permitted more quickly, while using human oversight on defined intervals with less interruption.

According to one or more embodiments of the present disclosure, authorization for a user may be dynamically tailored based on an intent of the user with respect to a specific application function. For example, in some embodiments, the IAM system may generate a suitable authorization token (or authorization token information) to enable a user that is logged-in to and using a first application (e.g., a calling application) to access an application function of a second application (e.g., a target application) from the first application. In this case, even though the user is logged-in to the first application with suitable permissions and access levels for the first application, in order to access an application function of the second application from the first application, the second application may require a suitable authorization token to enable the application function for the user. However, rather than providing all of the authorization and access levels of the user to the second application based on all of the user attributes of the user, the authorization token may be dynamically tailored based on only those user attributes needed to enable the application function in the second application, such that a payload of the authorization token may be reduced, while enabling just the right amount of authorization needed by the second application to enable the corresponding application function for the user.

The above and other aspects and features of the present disclosure will now be described in more detail with reference to the figures.

FIG. 1 illustrates an environment of an identity and access management system according to one or more embodiments of the present disclosure.

Referring to FIG. 1, in some embodiments, the environment 100 may include an enterprise environment 100 of an organization (e.g., a business). The enterprise environment 100 may include an identity and access management (IAM) system 102 to provide dynamic role-based access control (dynamic RBAC) to one or more applications App 1 to App N (where N is a natural number) for a plurality of users of user devices 104a and 104b (hereinafter, collectively referred to as users 104 or user devices 104, or individually referred to as a user 104 or a user device 104). For example, the IAM system 102 may identify, authenticate, and authorize each of the users 104 over a network 106 to login to the one or more applications App 1 to App N with appropriate permissions and access levels based on various user attributes and contact information of the users, their roles within the organization, access boundaries of various application functions, event information from other enterprise systems and subsystems, and the like, in order to perform various job related functions. Accordingly, each of the users 104 may be granted access to different ones of the applications App 1 to App N, or may be granted different access or permission levels to the applications App 1 to App N. For example, one user may be granted read and modify rights to certain files based on his/her particular roles and attributes, while another user may be granted no access rights or only read rights to those same files based on his/her particular roles and attributes.

In brief overview, when a user 104 logs in to a particular application (e.g., App 1) managed by an application provider 122 via a user interface UI or a user experience UX using a suitable authentication mechanism (e.g., a username and password, multi-factor authentication mechanism, hard or soft token time-based one time password (TOTP), smart card, biometrics, and/or the like), the application provider 122 may communicate with one or more identity provider(s) 124 to authenticate the user 104. The identity provider(s) 124 may generate a suitable identity token based on the authentication mechanism used, and may provide the identity token to the IAM system 102. The IAM system 102 may use the identity token to identify application specific user attributes of the user that are expected by the particular application in order to provide the suitable permissions and access levels for the user. The IAM system 102 may generate and provide an authorization token (or authorization token information) to the identity provider(s) 124 according to the application specific user attributes, and the identity provider(s) 124 may generate and provide a login token to complete the login of the user. The login token may include at least the authorization token (or the authorization token information) to enable the application to provide the suitable permissions and access levels to the user. In some embodiments, the login token may include information combined from the identity token and the authorization token.

The network 106 may be structured to enable the exchange of data, values, instructions, messages, and/or the like among the IAM system 102 and the user devices 104. In various embodiments, the network 106 may include any suitable wired or wireless network (e.g., a Local Area Network (LAN), a Wide Area Network (WAN), cellular communications network, and/or the like). For example, the network 106 may include Frequency Division Multiple Access (FDMA), Time Division Multiple Access (TDMA), Code Division Multiple Access (CDMA) (e.g., Evolution-Data Optimized (EVDO)), Universal Mobile Telecommunications Systems (UMTS) (e.g., Time Division Synchronous CDMA (TD-SCDMA or TDS)), Wideband Code Division Multiple Access (WCDMA), Long Term Evolution (LTE), evolved Multimedia Broadcast Multicast Services (eM-BMS), High-Speed Downlink Packet Access (HSDPA), Universal Terrestrial Radio Access (UTRA), Global System for Mobile Communications (GSM), Code Division Multiple Access 1x Radio Transmission Technology (1x), General Packet Radio Service (GPRS), Personal Communications Service (PCS), 802.11X, Bluetooth, Wi-Fi, any suitable wired network, combinations thereof, and/or the like.

While FIG. 1 shows only a part of the enterprise environment 100 including the IAM system 102, the identity provider(s) 124, and the application provider(s) 122, the present disclosure is not limited thereto. For example, as would be understood by those skilled in the art, the enterprise environment 100 may include various other enterprise systems and subsystems, for example, such as human resource (HR) management systems, global change request management systems, enterprise resource planning (ERP) systems, various security systems, and/or the like. These systems and subsystems may be directly connected to the IAM system 102 (e.g., via local wired or wireless communications) or via the network 106 (e.g., a WAN, the Internet, a cellular network, and/or the like). Accordingly, in some embodiments, the IAM system 102 may receive and analyze various information (e.g., event information) from these enterprise systems and subsystems to determine if and how much authorization may be granted at any given time.

Figure 2:
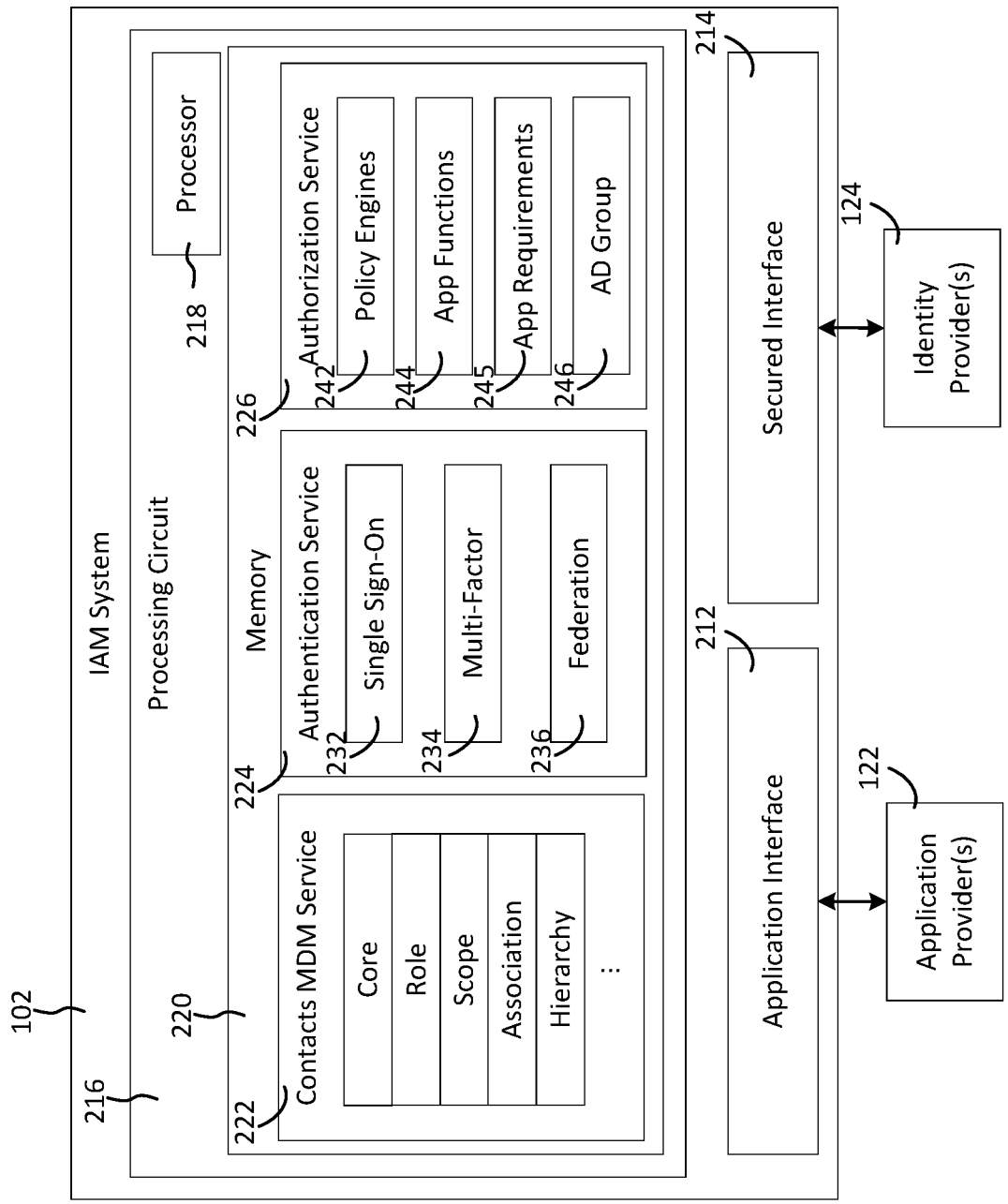
FIG. 2 illustrates an identity and access management system according to one or more embodiments of the present disclosure.

FIG. 2 illustrates an identity and access management system according to one or more embodiments of the present disclosure.

Referring to FIG. 2, the IAM system 102 may be communicably connected to the application providers 122 and the identity providers 124. For example, in some embodiments, the IAM system 102 may include an application interface (e.g., APIs) 212 for communicating with the application providers 122, and a secured interface 214 for communicating with the identity providers 124. While FIG. 2 shows each of the application interface 212 and the secured interface 214 as separate interfaces, the present disclosure is not limited thereto, and in other embodiments the application interface 212 and the secured interface 214 may be a part of the same interface.

The interfaces 212 and 214 may be or include wired or wireless communications interfaces (e.g., jacks, antennas, transmitters, receivers, transceivers, wire terminals, and/or the like) for conducting data communications with the IAM system 102. In various embodiments, communications via interfaces 212 and 214 can be direct (e.g., local wired or wireless communications) or via the network 106 (e.g., a WAN, the Internet, a cellular network, and/or the like). For example, interfaces 212 and 214 may include a Wi-Fi transceiver for communicating via a wireless communications network. In another example, interfaces 212 and 214 may include an Ethernet card and port for sending and receiving data via an Ethernet-based communications link or network. In another example, one or more of interfaces 212 and 214 may include cellular or mobile phone communications transceivers. In various embodiments, the interfaces 212 and 214 may support various protocols (e.g., TCP/IP, User Datagram Protocol UDP, Hypertext Transfer Protocol HTTP, Internet Message Access Protocol IMAP, Simple Mail Transfer Protocol SMTP, and/or the like) and/or data communication interfaces (e.g., APIs, Web Services, and/or the like) for facilitating data communications with the application providers 122 and the identity providers 124.

The application providers 122 may manage the applications App 1 to App N, and may define various application functions and their access boundaries for each of the applications App 1 to App N. For example, the application providers 122 may communicate with the IAM system 102 to define the application functions and their access boundaries based on, for example, business roles, business policies, mappings, functions, and/or the like. The application providers 122 may provide application requirements (e.g., formatting and input requirements) to the IAM system 102 in order to generate a suitable authorization token (or authorization token information) that may be understood by an application to provide a suitable level of access to a user. The application requirements may correspond to the user attributes and formatting requirements expected by the application in order to enable certain ones of the application functions. For example, in some embodiments, the IAM system 102 may expose various APIs (e.g., via the application interface 212) to the application providers 122 to enable the applications providers 122 to define the application functions, and the application requirements (e.g., the formatting and expected input requirements) for the authorization tokens to be usable by the applications to determine the permissions and access levels of a user.

The identity providers 124 may provide identity and/or authentication services for the applications App 1 to App N to authenticate the users. For example, when a user logs in to an application (e.g., via the UI or UX of the application) using a user device 104, the user may provide login information (e.g., an authentication mechanism such as a username and password, multi-factor authentication mechanism, hard or soft TOTP, smart card, biometrics, and/or the like) at the UI or UX (e.g., a login page, access device, and/or the like). The login information may be provided to the identity providers 124 to identify and authenticate the user. For example, in response to the login information, the identity providers 124 may generate a suitable identity token according to the authentication mechanism provided by the user to identify and authenticate the user, and may provide the identity token to the IAM system 102 to determine the authorizations of the user within the application. For example, the identity token may include identity information (e.g., username or other authentication mechanism used to authenticate the user) and group information (e.g., active directory (AD) group information) associated with the user. In some embodiments, the identity token may also identify the application to which the user is requesting login. Some non-limiting examples of the identity providers 124 may include, for example, Azure (e.g., Azure B2C, Azure AD, and/or the like), Okta, Google, Facebook, and/or the like.

The IAM system 102 may generate a suitable authorization token (or authorization token information) for the user to login to and access an application based on the app functions and app requirements defined for the application by a corresponding application provider 122, various user attributes particular to the user and used by the application to determine the permissions and access levels of the user, and the authentication mechanism used to authenticate the user. For example, in some embodiments, the IAM system 102 may generate corresponding authorization policies according to the app functions and app requirements defined by the application providers 122, and when the user logs in to a particular application, the corresponding authorization policies for the particular application may be driven by the user attributes of the user identified using the identity token, such that when certain user attributes are present, the corresponding authorization policies may be executed to generate a suitable authorization token (or authorization token information) for the particular application to provide a level of access to the particular user according to the information contained in the authorization token.

In some embodiments, the identity token may be used to identify whether the authentication mechanism used to authenticate the user is sufficient to grant the authorizations of a particular authorization policy. For example, when a user is switching through applications using SSO, a subsequent application may have different authentication requirements from those of the previous application, such that the IAM system 102 may require the user to authenticate again using a different authentication mechanism (e.g., a multi-factor authentication mechanism) before being granted suitable permissions and access levels to use the subsequent application. Accordingly, if certain attributes are present and the authentication mechanism used to authenticate the user is appropriate, the corresponding authorization policies may be executed to generate the authorization token (or the authorization token information), which may then be used by the identity provider 124 to generate a login token to complete login for the user to the corresponding application.

The corresponding application may process the login token to provide suitable permissions or access levels to the user based on the information contained in the authorization token (or the authorization token information) in the login token.

In more detail, the IAM system 102 may include a processing circuit 216 including one or more processors 218 and memory (e.g., one or more memory or other storage devices) 220. Although illustrated as a single processing circuit 216 in FIG. 2, the processing circuit may be distributed and implemented on multiple computing devices and storage devices. The processing circuit 216 may be communicably connected to the application interface 212 and the secured interface 214, such that the processing circuit 216 and the various components thereof can send and receive data via the interfaces 212 and 214. The processor 218 may be implemented with one or more general-purpose processors, an ASIC, one or more FPGAs, a DSP, a group of processing components that are distributed over various geographic locations or housed in a single location or device, or other suitable electronic processing components.

The memory (e.g., memory device, memory unit, one or more memory devices, storage device, or the like) 220 may be implemented with RAM, NVRAM, ROM, Flash Memory, hard disk storage, cloud storage, and/or other suitable electronic storage devices. The memory 220 stores data and/or computer code for facilitating at least some of the various processes described herein. The memory 220 includes tangible, non-transitory, volatile or non-volatile memory. The memory 220 may include database components, object code components, script components, and/or any other type of information structure for supporting the various activities and information structures described in the present application. According to an embodiment, the memory 220 is communicably connected to processor 218 via the processing circuit 216, and includes computer code for executing (e.g., by processing circuit 216 and/or the processor 218) one or more processes described herein. For example, the memory 220 stores instructions or programming logic that, when executed by the processor 218, controls the operations of the IAM system 102. In some embodiments, the processor 218 and the memory 220 may form or be part of various processing circuits in the IAM system 102.

In some embodiments, the memory 220 includes a contacts master data management (MDM) service 222, an authentication service 224, and an authorization service 226. Services 222 to 226 may be configured to receive inputs from the application providers 122, the identity providers 124, and other data sources (e.g., other enterprise systems and subsystems), determine actions for the IAM system 102 based on the inputs, generate control signals based on the actions, and provide the generated control signals to the interfaces 212 and 214 for communicating with the application providers 122 and the identity providers 124, respectively. While FIG. 2 shows that each of the contacts MDM service 222, the authentication service 224, and the authorization service 226 are part of the same processing circuit 216, the present disclosure is not limited thereto. For example, each of the services 222 to 226 may be implemented on one or more internal processing circuits with respect to the IAM system 102 or may be implemented on one or more external processing circuits as part of a cloud-based computing system.

In some embodiments, the contacts MDM service 222 may include a centralized data store for storing the user attributes and other contact information of each of the users 104 that are used to generate the authorization tokens for accessing each of the applications App 1 to App N (e.g., see FIG. 1). For example, the user attributes may include core attributes (e.g., the name (e.g., first, middle, and last), date of birth (DOB), address, email, and/or the like), role attributes (e.g., department, title, and/or the like), scope attributes (e.g., functions, responsibilities, and/or the like), association attributes (governmental, private, and/or the like), hierarchy attributes (e.g., organizational hierarchy, supervisor, and/or the like), and/or other attributes and tags that define the various attributes and other contact information of the users that are used by various different applications App 1 to App N, such that the contacts MDM service 222 stores all of the user attributes and contact information required by the applications App 1 to App N to provide the appropriate permissions and access levels to the user. These attributes may be distinctive or may partially overlap with one another depending on the attribute types used by the different applications App 1 to App N, and different applications App 1 to App N may use different ones and/or combinations of the attribute types. For example, one application may require certain role and association attributes in an authorization token, while another application may require certain scope and hierarchy attributes in an authorization token, and there may be some overlap between them depending on the types of attributes used by the various applications to provide the appropriate authorizations. Accordingly, the contacts MDM service 222 serves as a centralized data store for all of the user attributes and contact information used by the various different applications App 1 to App N in order to provide the suitable permissions and access levels to various different users 104 based on their particular attributes stored in the contacts MDM service 222.

The contacts MDM service 222 may communicate and/or be synchronized with the user attributes and other contact information stored by the identity providers 124 and other enterprise systems or subsystems (e.g., HR management system), such that all of the user attributes and other contact information used by each of the applications App 1 to App N may be stored therein. In some embodiments, the authentication service 224 and/or the authorization service 226 may query the user attributes and contact information from the contacts MDM service 222 as needed or desired in order to authenticate and/or authorize the users to login to the applications App 1 to App N with the appropriate permissions and access levels. For example, the authentication service 224 may query the contacts MDM service 222 using information contained in the identity token provided by an identity provider 124 to generate an application specific user profile. The application specific user profile may be specific to the particular application to which the user is requesting login, such that it contains only the user attributes of the user from among all of the user attributes stored by the contacts MDM service 222 that are used by the particular application to grant suitable permissions and access levels to the user.

In some embodiments, the contacts MDM service 222 may be accessible by the applications App 1 to App N to provide desired contact information to the applications App 1 to App N on demand. For example, in some embodiments, the contacts MDM service 222 may be implemented based on a publish and subscribe model such that the applications that are subscribed thereto may request the user attributes and contact information for the users 104, and the contacts MDM service 222 may publish responses to the subscribed applications. Accordingly, instead of each of the applications App 1 to App N managing its own contact information, which may not be shared, the contacts MDM service 222 may be a source of ground truth for all the user attributes and other contact information that are used to drive the authorizations for each of the various applications App 1 to App N.

The authentication service 224 may communicate with the identity providers 124 to identify and authenticate the login information of the users 104. For example, the authentication service 224 may communicate with the identity providers 124 to provide single sign-on (SSO) services 232, multi-factor authentication services 234, and/or the like. The identity providers 124 may identify and authenticate the user according to an authentication mechanism used, and may generate and provide an identity token to the authentication service 224. The identity token may include, for example, identity information of the user, active directory (AD) group information of the user, and/or the like.

In some embodiments, the authentication service 224 may parse the identity information for the user from the identity token, and may query the contacts MDM service 222 based on the identity information to retrieve the user attributes of the user. In some embodiments, the authentication service 224 may identify an application corresponding to the user login, and may filter the user attributes according to an application profile for the application. For example, as discussed in more detail below, in some embodiments, when the authorization service 226 generates the authorization policies for an application based on the app functions 244 and the app requirements 245 of the application, the authorization service 226 may generate an application profile for the application corresponding to all of the various sets and combinations of user attribute types used to enable the various application functions of the application. Thus, when a user logs in to the application, the authentication service 224 may use the application profile for the application to filter the user attributes of the user stored in the contacts MDM service 222 according to the user attribute types used by the application to generate an application specific user profile (e.g., an app user profile) to include only those user attributes (e.g., user attribute set) of the user that are relevant to the application in determining the permissions or access levels that should be granted to the user. The authentication service 224 may provide the app user profile to the authorization service 226 to select and execute one or more corresponding authorization policies to generate a suitable authorization token according to the user attribute set in the app user profile.

In some embodiments, the authentication service 224 may provide federation services 236 for the identity providers 124, for example, when supporting SSO and the like. In some embodiments, the authentication service 224 may determine the authentication mechanism used to authenticate the user from the identity token.

In some embodiments, the authentication service 224 may communicate with the authorization service 226 to determine whether the authentication mechanism used is appropriate for the level of access that may be granted to the user by the authorization service 226. For example, if an authorization policy used to generate an authorization token indicates that a different authentication mechanism is required in order to grant the corresponding permissions and access levels, the authorization service 226 may communicate with the authentication service 224 to request that the user be authenticated again using the different authentication mechanism before granting the authorization (e.g., before generating or providing the authorization token). In this example, the authentication service 224 may communicate with the identity providers 124 to request the user to provide the different authentication mechanism in order to generate and provide a new identity token according to a different authentication mechanism that is appropriate for the authorization granted by the authorization service 226, and the new identity token may be used to generate the authorization token for authorizing the user.

For a non-limiting example, in the case of SSO, when a user switches from a public application that accepts an SSO identity token to another application that requires a multi-factor authentication identity token, the authorization service 226 in executing an authorization policy may communicate with the authentication service 224 to request the multi-factor authentication identity token in order to generate the authorization token. The authentication service 224 may communicate with the identity providers 124 to authenticate the user based on a multi-factor authentication mechanism, and the identity providers 124 may generate and provide a new identity token corresponding to the multi-factor authentication mechanism used to authenticate the user.

The authorization service 226 may generate the authorization policies according to the app functions 244 and the app requirements 245 provided by the application providers 122, and may execute suitable ones of the authorization policies to generate the authorization tokens according to the user attribute set of the user in the app user profile. For example, in some embodiments, the authorization service 226 may include a plurality of policy engines 242 that may define the authorization policies of each of the applications App 1 to App N to generate a suitable authorization token for the user to access a particular application with suitable permissions and access levels. The authorization policies may be generated based on the app functions 244 and the app requirements 245 defined by the application providers 122, and the authorization policies may be executed to generate the authorization token based on the particular user attributes and contact information of the user (e.g., the user attribute set) contained in the app user profile for the user and the authentication mechanism used to authenticate the user.

For example, in some embodiments, the app functions 244 may correspond to different functions of an application that may be provided based on the permissions and access levels of a user, and the app requirements 245 may define the expected inputs (e.g., the user attributes) and formatting requirements of the authorization token in order to enable the app functions 244. Thus, the app functions 244 may define the access boundaries of the application, and the app requirements 245 may define the particular business roles, business goals, business policies, mappings, and/or the like that are used by an application to provide the permissions and access levels necessary to access a particular app function 244 of the application.

The policy engines 242 may generate various authorization policies according to the app functions 244 and the app requirements 245 defined by the application providers 122, and may generate a corresponding application profile for each of the applications App 1 to App N to associate (e.g., to tie or to map) each of the authorization policies to various expected user attributes that, when present, triggers the execution of a corresponding authorization policy to generate the authorization token. Accordingly, when a user requests login to a particular application, the authentication service 224 may use the application profile of the particular application to filter the user attributes retrieved from the contacts MDM service 222 to generate the app user profile for the user, and the authorization service 226 may use the app user profile to determine which of the authorization policies to execute in order to generate an appropriate authorization token for the particular application.

As a non-limiting example, an app function 244 may provide that "people in the billing department should be able to read and modify account information to adjust resources." In this example, a corresponding app requirement 245 may define the user attributes needed by the application to determine that a user is in the billing department in order to enable the app function 244 of reading and modifying account information for the user. The policy engines 242 may generate an authorization policy according to the app function 244 and the corresponding app requirements 245 that, when executed, generates an authorization token to enable such app function 244. The policy engines 242 may associate (e.g., may tie or map) the authorization policy to certain user attributes (e.g., title, department, and/or the like) in a corresponding application profile, which may be used by the authentication service 224 to retrieve the certain user attributes from the contacts MDM 22 that identify whether the user is in the billing department (e.g., a functional role) as mapped to application roles (e.g., business roles) defined by the app function 244, such that when a user logging into the application has the correct user attributes, the authorization policy may be executed to generate the authorization token indicating that the user is in the billing department, and thus, is authorized to read and modify account information to adjust resources.

In some embodiments, in order to support legacy systems that use general groupings of user rights to provide access, the policy engines 242 may also generate authorization tokens based on groupings in an activity directory (AD) group 246 that are mapped to local business roles individually managed by the applications. For example, because some of the applications App 1 to App N may already be configured to provide access based on local mappings of business roles to various groups in the AD group 246, the policy engines 242 may generate authorization policies that utilize the groups in the AD group 246 to generate the authorization tokens. The groups in the AD group 246 may be distinguishable from the user attributes and contact information in the contacts MDM 222, in that they may refer to a group of people (e.g., billing department) rather than individual attributes of a user (e.g., a billing coordinator). In this case, there may be a transitional period in which operational teams may evaluate the AD groups, and may translate the AD groups to suitable sets of user attributes used by the applications to determine the authorizations of the users. In the case of conflicts (e.g., overlapping user attribute sets and AD groups), the application providers 122 may define how the IAM system 102 should handle the conflicts. However, the present disclosure is not limited thereto, and in other embodiments, the AD group 246 may be omitted.

Accordingly, in various embodiments, the policy engines 242 may generate the authorization polices based on the app functions 244 and/or the AD groups 246, which may be selectively executed according to the particular user attributes of the user and the authentication mechanism used to authenticate the user in order to generate a suitable authorization token that may be used by an application to provide the appropriate permissions and access levels to the user. The policy engines 242 will be described in more detail hereinafter with reference to FIG. 3.

Figure 3:
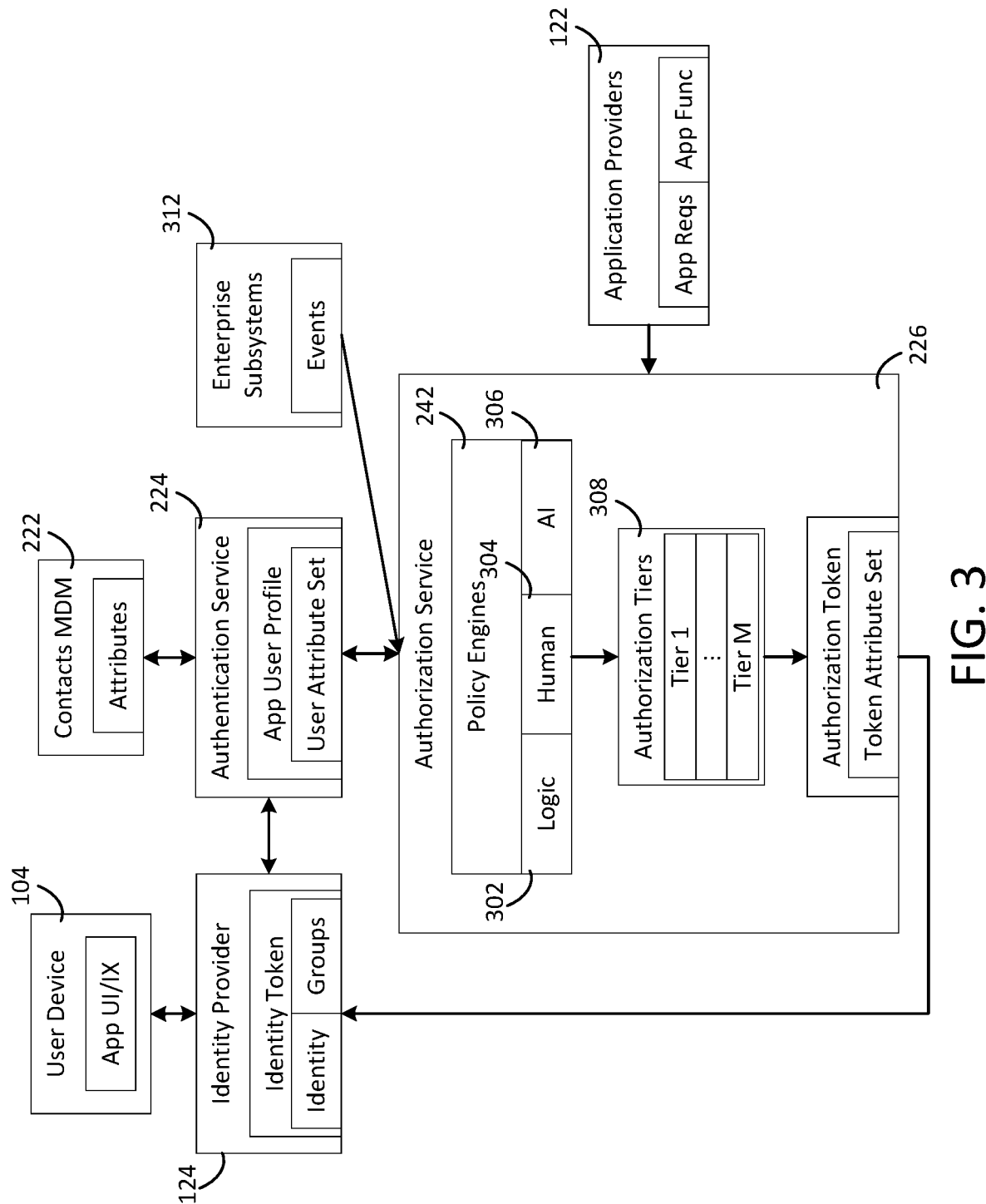
FIG. 3 illustrates policy engines of an authorization service according to one or more embodiments of the present disclosure.

FIG. 3 illustrates policy engines of an authorization service, such as the authorization service 226, according to one or more embodiments of the present disclosure.

Referring to FIG. 3, the policies engines 242 may include a logic policy engine 302, a human policy engine (e.g., a human verification policy engine) 304, and an AI policy engine 306 to determine the permissions and access levels that may be granted to a user based on the particular user attributes of the user. The logic policy engine 302 may generate authorization policies according to the app functions 244 and the app requirements 245 defined by the application providers 122, and the human policy engine 304 (e.g., via a system administrator 310) may define the AD groups 246 such that authorization policies may be generated according to the AD groups 246. The human policy engine 304 may override the authorizations granted to a user (e.g., by the logic policy engine 302), and may adjust the permissions and access levels of the user as appropriate. The AI policy engine 306 may be trained over time to appropriately select and/or adjust the authorization policies using supervised machine learning models that may be verified and reinforced by the human policy engine 304.

In some embodiments, the authorization policies may be tiered (e.g., Tier 1 to Tier M) in various suitable authorization tiers 308 according to a level of access that may be granted to a user, such that the lower the tier, the more authorization rights are granted to the user. For example, a top tier Tier 1 may include the least restrictive authorization policies to generate an authorization token that provides birth-rights (e.g., minimal authorization rights or global authorization rights) for a user across various applications, and a lowest tier Tier M (where M is a natural number) may include the most restrictive authorization policies to generate an application specific authorization token that provides maximum authorization rights for a user on a per-application or per-service basis.

In some embodiments, each of the tiers (e.g., Tier 1 to Tier M) may be associated with (e.g., tied to) one or more user attributes, such that if a user has certain user attributes, an appropriate tier may be selected so that the authorization policies thereof may be executed to generate the authorization token. For example, the logic policy engine 302 may generate a corresponding application profile for each of the tiers defining the user attributes needed to execute the authorization policies of the tiers, and the application profile may be used by the authentication service 224 to filter the user attributes from the contacts MDM 222 in response to a user login request as discussed above. The user attributes that are associated with each of the tiers may depend on the app function 244 or AD group 246 used to generate the authorization policies of a corresponding tier. For example, in some embodiments, the logic policy engine 302 may analyze the app functions 244 and the app requirements 245 to determine the user attributes needed to associate (e.g., to tie) a user to an application role (e.g., a business role) defined by a corresponding app function 244. As another example, in some embodiments, the human policy engine 304 (e.g., via the system administrator 310) may define the groups in the AD group 246, such that the human policy engine 304 may translate the groups in the AD group to various user attribute sets during a transitional period that the application can associate with a corresponding app function 244. In some embodiments, the AI policy engine 306 may assist with the migration of the groups in the AD groups to various user attribute sets, which may be verified by the human policy engine 304.

In some embodiments, the authorization policies in the authorization tiers 308 may define the authentication requirements needed to authorize a user. For example, while executing the authorization policies of a particular tier based on the user attribute set of the app user profile, the authorization policies may indicate that a different authentication mechanism is needed to properly authenticate the user for a corresponding application function. In this case, the logic policy engine 302 may request the different authentication mechanism for the user from the authentication service 224 in order to authorize the user for the corresponding application. In some embodiments, if the user cannot be authenticated via the different authentication mechanism, the authorization may be denied, or the authorization policies of a different lesser restrictive authorization tier may be selected and executed based on the previous authentication mechanism provided.

Accordingly, in some embodiments, when a user 104 logs into an application via an app UI/UX, the identity provider 124 may generate a suitable identity token according to the authentication mechanism used, and may provide the identity token to the authentication service 224. The identity token may include identity information corresponding to the authentication mechanism used, AD group information associated with the user, and/or the like. The authentication service 224 may use the identity information to retrieve the user attributes from the contacts MDM 222, and may filter the user attributes into a user attribute set according to a corresponding application profile of the application to generate the app user profile. The authorization service 242 (e.g., the logic policy engine 302) may use the user attribute set in the app user profile to identify one or more authorization tiers 308 tied to one or more of the user attributes in the user attribute set, and may execute the authorization policies of the one or more authorization tiers 308. The logic policy engine 302 may determine from the authorization policies of the one or more authorization tiers 308 whether the authentication mechanism used to authenticate the user is appropriate for the authorization polices. If the authentication mechanism is appropriate, the logic policy engine 302 may generate the authorization token according to the authorization policies, and the authorization token may be provided to the identity provider 124 to complete login of the user 104 to the application with suitable permissions and access levels defined by the authorization token. For example, the identity provider 124 may generate a login token including at least the authorization token (or the authorization token information) to complete the login of the user. In some embodiments, the login token may include information combined from the identity token and the authorization token. The permissions and access levels provided by the logic policy engine 302 may then be adjusted and/or overridden by the human policy engine 304 as needed or desired.

The actions of the logic policy engine 302 and the human policy engine 304, and the interactions between them, may be observed by the AI policy engine 306 to learn how to grant suitable permissions and access levels over time. For example, the permissions and access levels granted by the logic policy engine 302 and any adjustments thereto by the human policy engine 304 may be used as labeled datasets to train the AI policy engine 306 to make authorization recommendations in a training mode. In some embodiments, the AI policy engine 306 may monitor other enterprise subsystems 212, user activities, type of user device used, location of the requested access, the user attributes used to select an authorization tier, and/or the like to make recommendations to modify authorization threshold levels and/or to recommend modifications to the permissions and access levels granted to a user as needed or desired. The recommendations of the AI policy engine 306 may then be verified by the human policy engine 304 as part of a cross validation process, and once the recommendations are appropriate and suitably accurate, the AI policy engine 306 may dynamically modify the authorizations granted to users as needed or desired in an assist mode.

For example, in some embodiments, the AI policy engine 306 may monitor events occurring in the enterprise environment 100, and may modify the authorizations provided to the users 104 as needed or desired. For example, in some embodiments, the AI policy engine 306 may communicate with a security system of the enterprise subsystems 312 to modify authorization threshold levels depending on a threat level. In this case, the authorization threshold levels may be modified, for example, by limiting the authorization policies of some of the lower authorization tiers 308 from being executed, or by increasing the authentication requirements for at least some of the authorization tiers 308. For example, the app functions 244, the authorization policies generated by the logic policy engine 302, the user attributes associated thereto, the level of authentication required by the authorization policies, and/or the like may be categorized by the AI policy engine 306 into various privileges, and those categorized as higher privileges may be prevented from being used until normal operations resume.

As another example, the AI policy engine 306 may communicate with a global change request system of the enterprise subsystems 312 to identify production deployment events during which time-limited authorizations may be granted to some users having appropriate user attributes. For example, in response to a production deployment event, the AI policy engine 306 may identify users having a production deployment tag attribute to grant enhanced permissions or access levels to the identified users for the affected applications for a duration of the production deployment event.

In some embodiments, the AI policy engine 306 may observe user actions to determine whether the user's permissions and access levels may be modified. For example, the AI policy engine 306 may identify the applications accessed by the user, the device used, the location and/or network of the requested access, and/or the like to determine discrepancies in order to appropriately adjust the authorization thresholds of the user. For example, if the requested access is from a trusted location, the AI policy engine 306 may lower the authorization thresholds for the user. On the other hand, if the user is requesting access to a rarely used application, from an unknown device, an untrusted location, and/or the like, the AI policy engine 306 may increase the authorization thresholds for the user.

As a non-limiting example, the AI policy engine 306 may determine that a user who has similar privileges to other users, always logs in at similar times, has the same manager, the predecessor in the same role of the user had the same access, and/or the like may be permitted access to an application. In addition, if no security incidents have arisen from devices running the same software versions, from the same city, the same broadband networks, and have used a soft time-based TOTP to authenticate, then the AI policy engine 306 may grant elevated permissions or access levels to the user, despite the user not being connected to his/her usual network.

The human policy engine 304 may be used to verify the recommendations and actions of the AI policy engine 306. For example, in some embodiments, groupings of similar attributes to permit authorization may be coupled with alerting and logging when a user is identified as higher risk. The system administrators, the user's manager, other users, the user him/herself, the application owner, and/or the like may all be identified to provide a safeguard against abuse. In addition, these same users may be used as a verification system for other users whose authorization is not granted. For example, a user may be prompted with a screen that states he/she was denied, but because the AI policy engine 306 may not be confident in its output, a quick button may be presented to ask multiple other users if they can authorize the attempted access. The human policy engine 304 may also permit the AI policy engine 306 to continuously reinforce and train itself based on a constantly verified training set. The AI policy engine 306 may be further trained through periodic audits of users whom it decided could have access, ensuring both that they should still be permitted and that the original decision was in fact correct. Accordingly, in some embodiments, access to an application may be permitted more quickly, while using human oversight on defined intervals with less interruption.

Figure 4:
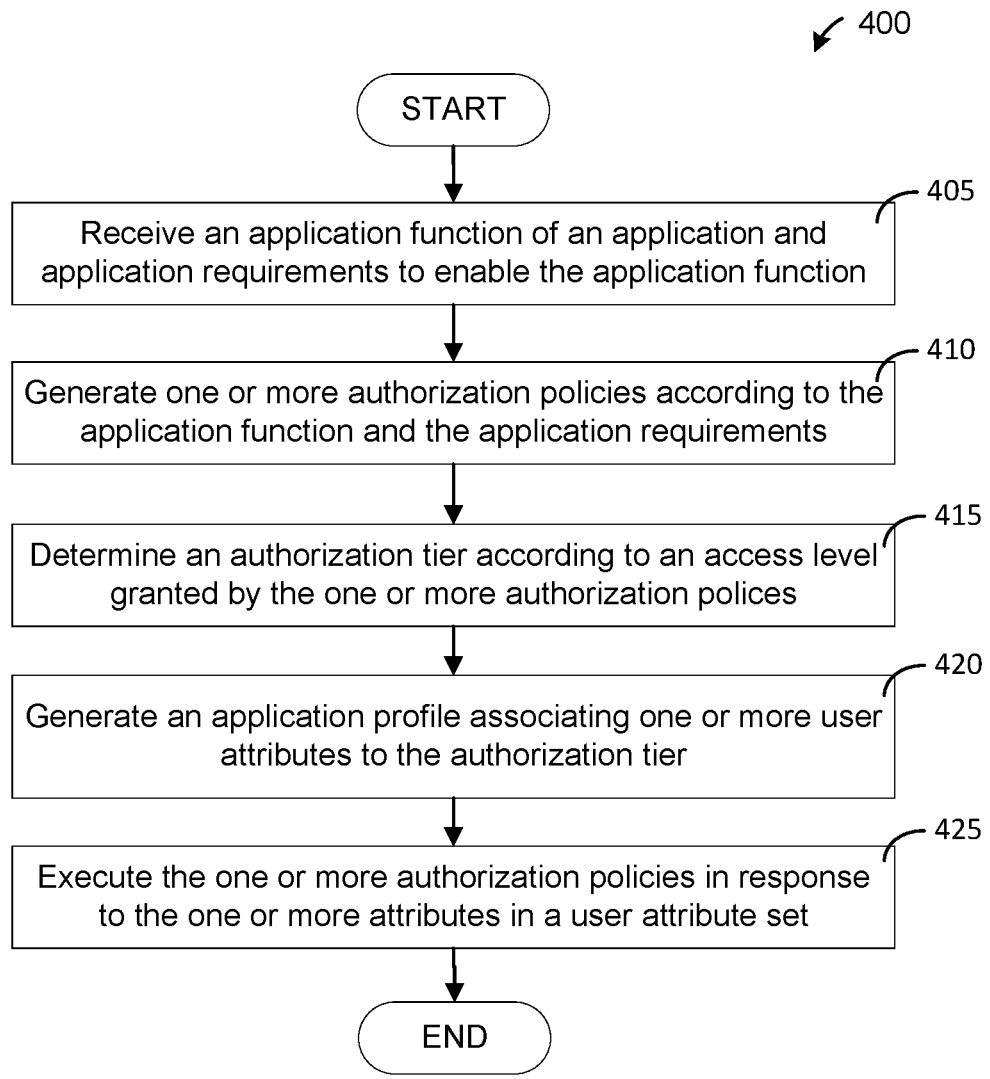
FIG. 4 is a flowchart of a method of generating authorization policies according to one or more embodiments of the present disclosure.

FIG. 4 is a flowchart of a method of generating authorization policies according to one or more embodiments of the present disclosure. For example, the method 400 may be performed by the authorization service 226 (e.g., the policy engines 242) shown in FIGS. 2 and 3. However, the present disclosure is not limited thereto, and the operations shown in the method 400 may be performed by any suitable one of the components and elements or any suitable combination of the components and elements of those of one or more example embodiments described above. Further, the present disclosure is not limited to the sequence or number of the operations of the method 400 shown in FIG. 4, and can be altered into any desired sequence or number of operations as recognized by a person having ordinary skill in the art. For example, in some embodiments, the order may vary, or the method 400 may include fewer or additional operations.

Referring to FIG. 4, the method 400 may start, and an application function of an application and application requirements to enable the application function may be received at block 405. For example, the application providers 122 may communicate with the IAM system 102 via the application interface 212 (e.g., APIs) to define the application functions and their access boundaries, as well as the application requirements (e.g., formatting and input requirements) of an authorization token to enable the application functions. For example, the application requirements may identify the expected user attributes for the application to enable the application functions, as well as the formatting requirements of the authorization token to include the expected user attributes in a format that may be used by the application to provide the suitable permissions and access levels to the user.

One or more authorization policies may be generated according to the application function and the application requirements at block 410. For example, in some embodiments, the authorization service 226 (e.g., the logic policy engine 302) may generate one or more authorization policies to enable one or more application functions according to the application requirements of those application functions. In some embodiments, the authorization policies may further define an appropriate level of authentication in order to authorize the user for a corresponding application function.

An authorization tier may be determined according to an access level granted by the one or more authorization policies at block 415. For example, in some embodiments, the authorization service 226 (e.g., the logic policy engine 302) may order all of the authorization policies generated for a particular application in a plurality of tiers according to the level of access granted (e.g., the application functions enabled) by the authorization policies. Each tier may include one or more authorization policies for enabling one or more application functions of the application, and may be associated with one or more user attributes expected by the application in order to enable the one or more application functions.

An application profile associating one or more user attributes to the authorization tier may be generated at block 420. For example, in some embodiments, the authorization policies for a particular application may be driven based on certain user attributes, that when present, allow the application to provide access to the corresponding application functions. Accordingly, the application profile for an application may be generated by the authorization service 226 to map the authorization tier to certain user attributes defined by the application requirements, and the application profile may be used (e.g., by the authentication service 224) to filter all of the user attributes of the user stored in the contacts MDM 222 to include only the user attribute set relevant to the application in order to provide the suitable authorizations to the user.

The one or more authorization policies may be executed in response to one or more attributes or one or more combination of attributes in the user attribute set at block 425, and the method 400 may end. For example, as discussed in more detail with reference to FIG. 5, in some embodiments, during a user login, the authentication service 224 may query the contacts MDM service 222 for the user's attributes according to the identity token received from the identity providers 124, and may filter the user's attributes according to the application profile for a corresponding application to identify only those user attributes that are relevant to the corresponding application. The authentication service 224 may generate an application specific user profile including the user attribute set corresponding to only those user attributes that are relevant to the corresponding application, and may provide the application specific user profile to the authorization service 226 to identify one or more authorization tiers according to one or more user attributes in the user attribute set. The authorization service 226 may execute the authorization policies of the identified one or more authorization tiers to generate an authorization token including the relevant user attributes used by the corresponding application to provide the authorization.

Figure 5:
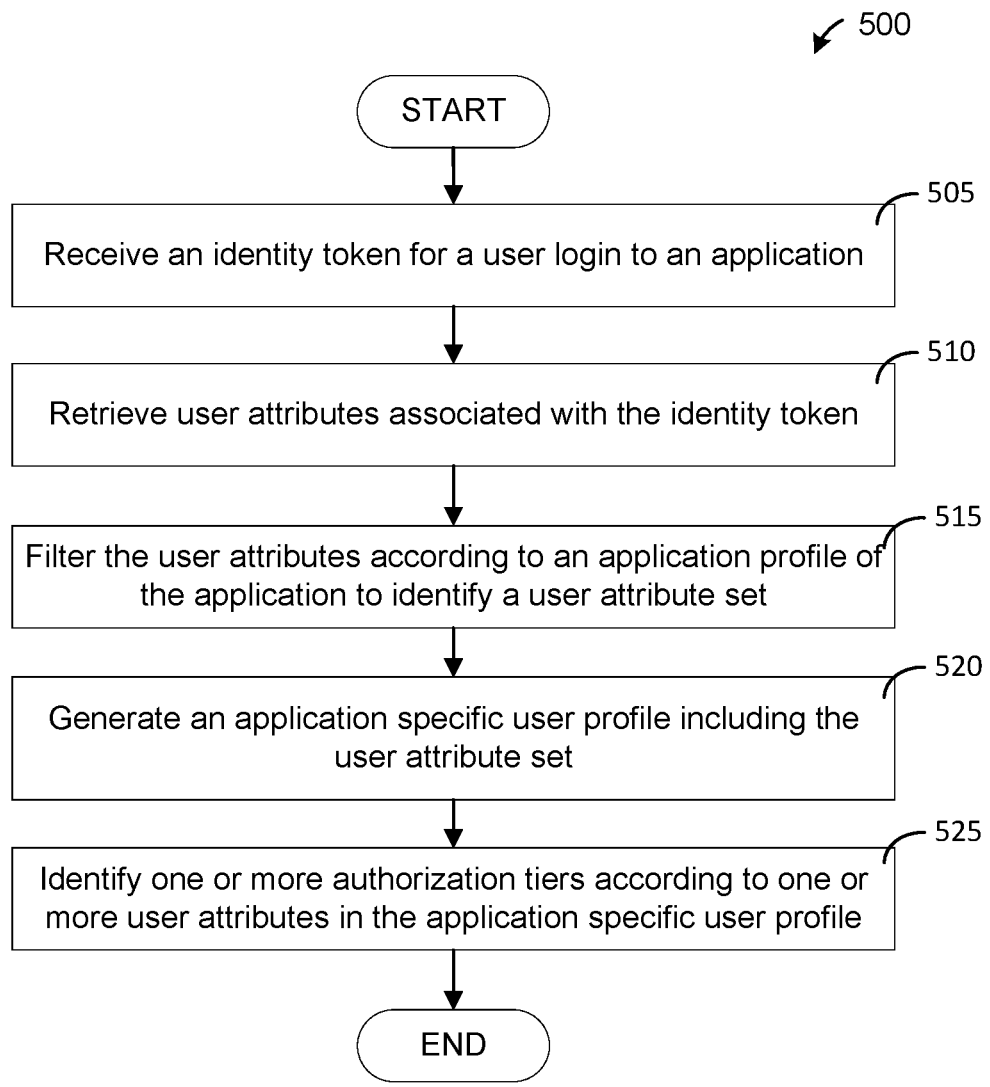
FIG. 5 is a flowchart of a method of generating an application specific user profile according to one or more embodiments of the present disclosure.

FIG. 5 is a flowchart of a method of generating an application specific user profile for authorizing a user according to one or more embodiments of the present disclosure. For example, the method 500 may be performed by the authentication service 224 and/or the authorization service 226 (e.g., the policy engines 242) shown in FIGS. 2 and 3. However, the present disclosure is not limited thereto, and the operations shown in the method 500 may be performed by any suitable one of the components and elements or any suitable combination of the components and elements of those of one or more example embodiments described above. Further, the present disclosure is not limited to the sequence or number of the operations of the method 500 shown in FIG. 5, and can be altered into any desired sequence or number of operations as recognized by a person having ordinary skill in the art. For example, in some embodiments, the order may vary, or the method 500 may include fewer or additional operations.

Referring to FIG. 5, the method 500 may start, and an identity token for a user login to an application may be received at block 505. For example, in some embodiments, the authentication service 224 may receive an identity token from an identity provider 124 corresponding to a user login at a UI/UX of a corresponding application. The identity token may include identity information (e.g., an authentication mechanism) of the user, group information (e.g., AD group information) that the user is associated with, and/or the like. In some embodiments, the identity token may further identify the application to which the user is requesting login.

User attributes associated with the identity token may be retrieved at block 510. For example, in some embodiments, the authentication service 224 may query the contacts MDM service 222 according to the identity information contained in the identity token to identify all of the user attributes associated with the user. The user attributes may then be filtered according to an application profile of the application to identify a user attribute set at block 515, and an application specific user profile including the user attribute set may be generated at block 520. For example, the authentication service 224 may identify a corresponding application profile of the application (or may communicate with the authorization service 226 to provide the corresponding application profile), and may filter the user attributes retrieved from the contacts MDM service 222 to identify the user attribute set relevant to the application for providing the suitable permissions and access levels to the user. The authentication service 224 may generate the application specific user profile including the user attribute set, and may provide the application specific user profile to the authorization service 226 to generate a suitable authorization token.

Accordingly, in some embodiments, one or more authorization tiers may be identified according to one or more user attributes or one or more combinations of the user attributes in the application specific user profile at block 525 to generate the suitable authorization token, and the method 500 may end. For example, as discussed in more detail below with reference to FIG. 6, in some embodiments, the authorization service 226 may identify one or more authorization tiers based on one or more user attributes or one or more combinations of user attributes in the user attribute set of the application specific user profile, and may execute the authorization policies of the authorization tiers to generate the suitable authorization token.

Figure 6:
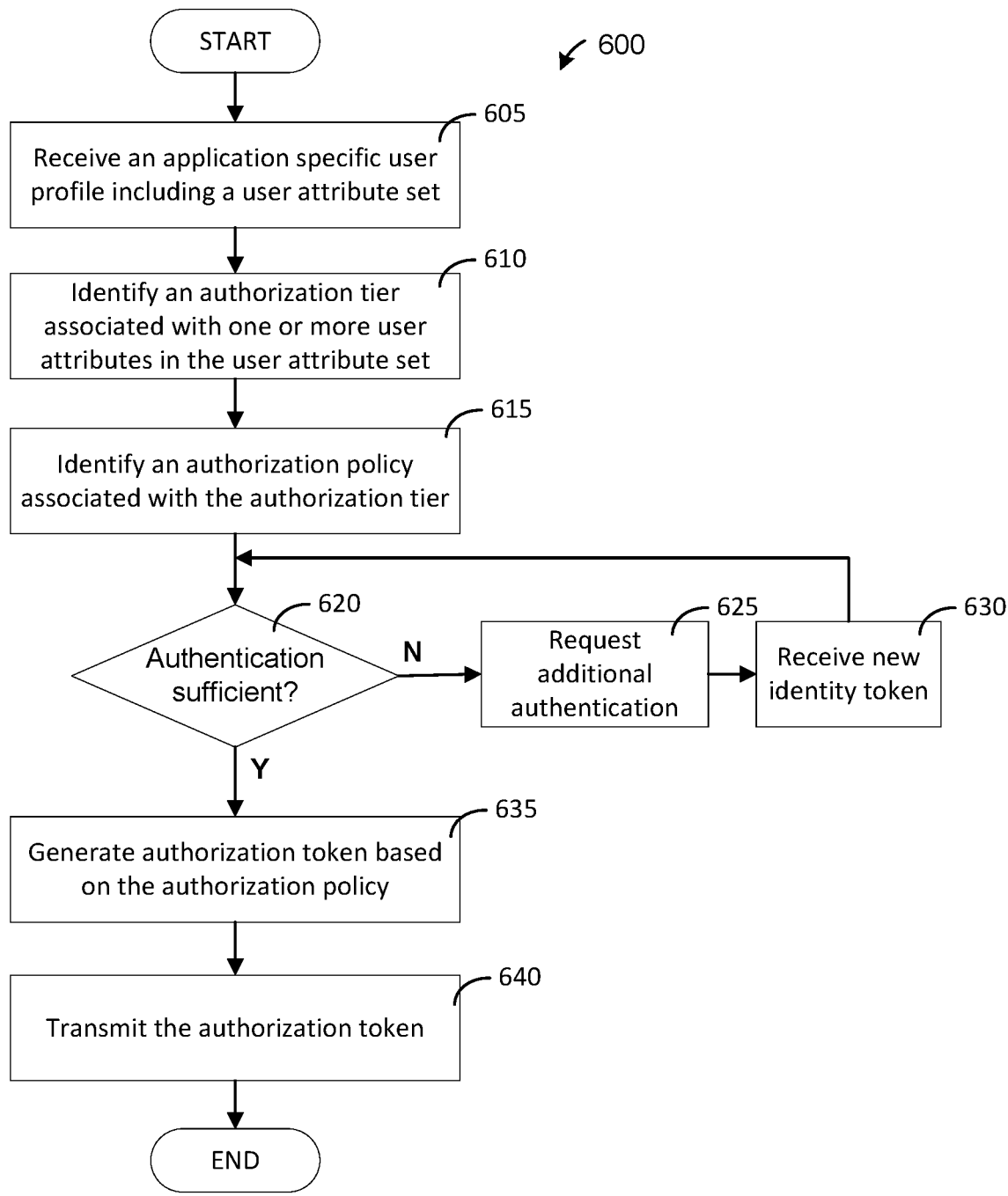
FIG. 6 is a flowchart of a method of generating an authorization token according to one or more embodiments of the present disclosure.

FIG. 6 is a flowchart of a method of generating an authorization token according to one or more embodiments of the present disclosure. For example, the method 600 may be performed by the authorization service 226 (e.g., the policy engines 242) and/or the authentication service 224 shown in FIGS. 2 and 3. However, the present disclosure is not limited thereto, and the operations shown in the method 600 may be performed by any suitable one of the components and elements or any suitable combination of the components and elements of those of one or more example embodiments described above. Further, the present disclosure is not limited to the sequence or number of the operations of the method 600 shown in FIG. 6, and can be altered into any desired sequence or number of operations as recognized by a person having ordinary skill in the art. For example, in some embodiments, the order may vary, or the method 600 may include fewer or additional operations.

Referring to FIG. 6, the method 600 may start, and an application specific user profile including a user attribute set may be received at block 605. For example, in some embodiments, as discussed above, the authentication service 224 may generate the application specific user profile by querying the contacts MDM service 222 according to the identity information of the identity token to retrieve the user attributes of the user, and filtering the user attributes according to an application profile of the application to identify a user attribute set relevant to the application for providing suitable permissions and access levels to the user. The authentication service 224 may provide the application specific user profile to the authorization service 226.

An authorization tier associated with one or more user attributes in the user attribute set may be identified at block 610, and an authorization policy associated with the authorization tier may be identified at block 615. For example, in some embodiments, the authorization service 226 may identify one or more authorization tiers that are associated with (e.g., tied to) one or more user attributes or one or more combinations of user attributes contained in the user attribute set, and each of the authorization tiers may include one or more authorization policies.

In some embodiments, the authorization policy may then be used to determine whether the authentication mechanism used to authenticate the user is sufficient to grant the permissions and access levels of the authorization policy at block 620. If the authentication mechanism is not sufficient (e.g., no N at block 620), additional or a different authentication method may be requested at block 625. For example, in some embodiments, the authorization service 226 (e.g., the logic policy engine 302) may communicate with the authentication service 224 to request the additional or different authentication of the user based on a different authentication mechanism. The authentication service 224 may communicate with the identity provider 124 to provide the additional or different authentication method based on the different authentication mechanism.

A new identity token may be received at block 630. For example, the identity provider 124 may generate and provide the new identity token based on the different authentication mechanism used to authenticate the user, and the method may continue at block 620 to determine whether the different authentication mechanism is sufficient. If the different authentication mechanism is sufficient or the original authentication mechanism is sufficient (e.g., yes Y at block 620) according to the authorization policy, an authorization token may be generated based on the authorization policy at block 635. The authorization token may be transmitted at block 640, and the method 600 may end. For example, in some embodiments, the authorization service 226 may transmit the authorization token to the identity provider 124, and the identity provider 124 may generate a suitable login token to complete the login of the user to the application. The login token may include at least the authorization token (or the authorization token information) including the expected user attributes for the application to provide the suitable permissions and access levels to the user. In some embodiments, the login token may include information combined from the identity token and the authorization token. Accordingly, the user may be logged in to the application using the login token, and the application may provide the appropriate permissions and access levels to the user based on the authorization token (or authorization token information) in the login token.

In some embodiments, the method 600 may further include a process of determining event information at least prior to transmitting the authorization token at block 640. For example, in some embodiments, the AI policy engine 306 may receive event notifications from other enterprise subsystems 312, and may modify and/or override the permissions and access levels granted by an authorization token generated by the logic policy engine 302. Accordingly, in some embodiments, the AI policy engine 306 may interrupt the method 600 at any suitable process block as necessary or desired according to the event notifications to modify authorization thresholds and/or timing thresholds of the authorizations granted to users.

Figure 7:
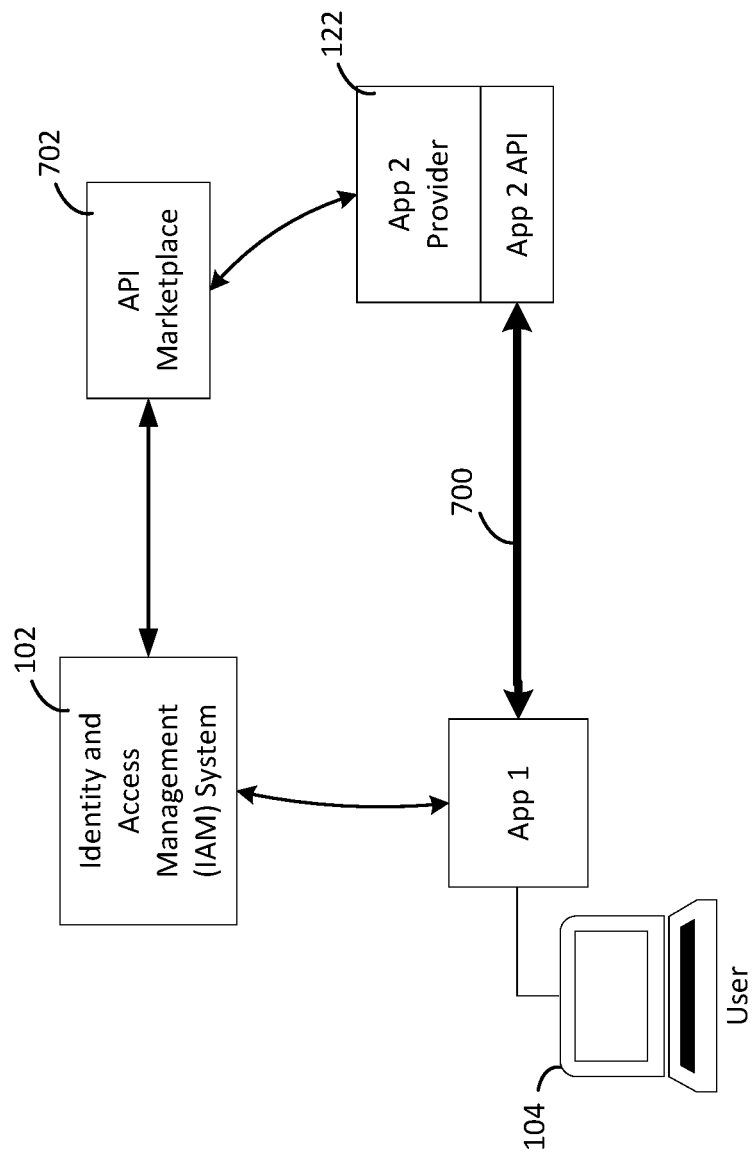
FIG. 7 illustrates an environment of an identity and access management system according to one or more embodiments of the present disclosure.

FIG. 7 illustrates an environment of an identity and access management system according to one or more embodiments of the present disclosure. In FIG. 7, the same or substantially the same elements as those described above with reference to FIG. 1 may be denoted with the same reference symbols, and thus, redundant description thereof may not be repeated.

For convenience of illustration, FIG. 7 shows a simplified schematic block diagram of an enterprise environment (e.g., see 100 FIG. 1), and depending on an implementation of the IAM system 102, the environment shown in FIG. 7 may further include other components and/or systems. For example, in some embodiments, the identity providers 124 shown in FIG. 1 may be further provided, and the applications (e.g., via the application providers 122) may be registered with, and communicably connected to, the identity providers 124 to provide identity/login services as described above. Further, while the figures show the applications as being operatively connected to the IAM system 102 (e.g., via a communications interface), in some embodiments, the applications may communicate and exchange information with the IAM system via the identity providers 124 and/or the application providers 122, similarly to the embodiments described above.

In some embodiments, authorization may be provided to a user based on an intent of the user with respect to a specific application function. For example, in some embodiments, a user 104 that is logged-in to a first application (e.g., a calling application) App 1 may request (e.g., may call) an application function of a second application (e.g., a target application) App 2 from the first application App 1. As an example, the first application App 1 may be a general user portal that shows open ticket items or tasks assigned to the user, and the second application App 2 may be a ticketing system that maintains ticket submissions and assigns various ticket items to various users. In this scenario, the first application App 1 may enable the user to view, modify, delete, and/or the like one or more ticket items maintained by the second application App 2 from the first application App 1, such that when the user selects an action (e.g., one of view, modify, delete, and/or the like) from the first application App 1, the intent of the user may be known with respect to one or more application functions of the second application App 2 based on the selected action within the first application App 1.

Accordingly, in some embodiments, the IAM system 102 may generate an authorization token (or authorization token information) for the user to provide authorization for limited access to one or more application functions of the second application App 2 based on the intent of the user (e.g., the selected action within the first application App 1), in addition to the various user attributes, access boundaries of the desired application functions of the second application, and/or the like. Thus, rather than authorizing all of the user's permissions and access levels of the second application App 2 within the first application App 1, the IAM system 102 may generate an authorization token to authorize only the desired application function of the second application App 2 for the user based on the selected action (e.g., the intent) within the first application App 1. It should be appreciated, however, that the embodiments described hereinafter do not prevent the user from directly logging-in to the second application App 2, for example, such that the user is authorized with all of the permissions and access levels in the second application App 2 according to the relevant user attributes stored in the contacts MDM service 222, as nonexclusively described above.

In some embodiments, rather than generating an authorization token to authorize all of the permissions and access levels for the user in the second application App 2 (e.g., based on the application user profile of the second application App 2 as discussed above), the IAM system may further filter the user attributes (e.g., based on an API function profile) to include only those attributes needed by a target API to authorize the specific application function. Thus, the authorization token may be generated for the target API based on the filtered attributes, such that only the information needed by the target API to authorize the specific application function of the second application App 2 for the user within the first application App 1 is provided. Accordingly, the payload of the resulting authorization token may be further reduced by further reducing the amount of unnecessary information for the second application App 2 to process, and security risks may be further reduced by providing limited authorization for the user to access only the application function of the second application App 2 needed to perform the selected action within the first application App 1.

In more detail, referring to FIG. 7, a user may be logged-in to the first application App 1 with all of the permissions and access levels enabled by the user attributes of the user for the first application App 1, for example, according to an authorization token for the first application App 1 generated by the IAM system 102 as described above. The first application App 1 may enable the user to select an action that invokes an application function of a second application App 2 from the first application App 1. For example, the first application App 1 may include a link, a button, or the like that causes the first application App 1 to READ, WRITE, MODIFY, DELETE, and/or the like data stored and/or accessible by the second application App 2.

In some embodiments, when the user of the user device 104 selects the link, the button, or the like in the first application App 1, the first application App 1 may request a suitable authorization token from the IAM system 102 based on the selected action, and may transmit a suitable API request 700 (e.g., over the network 106 shown in FIG. 1) to a target API (e.g., App 2 API) of the application provider 122 for the second application App 2 (e.g., App 2 provider) to invoke one or more application functions of the second application App 2. The API request 700 may include the suitable authorization token (or authorization token information) generated by the IAM system 102, such that only the information needed by the target API (e.g., App 2 API) is provided to enable only the corresponding application function of the second application App 2 for the user within the first application App 1.

For example, in some embodiments, when a call is made to the target API (e.g., App 2 API), the calling application (e.g., App 1) may communicate with the IAM system 102 to retrieve information about a calling identity, and the IAM system 102 generates a specific authorization token based on the calling identity with only the information needed to call the target API and be authorized. In other words, the authorization token may include only the information needed by the target API to authorize access to a corresponding application function. For example, when requesting the authorization token for a target API (e.g., App 2 API), the calling application (e.g., App 1) may provide identity information identifying the calling application and/or the user to the IAM system 102, and the IAM system 102 uses the identity information to obtain fresh tokens (when necessary) on behalf of the user. The IAM system 102 uses the provided information in order to retrieve (e.g., from the contacts MDM service 222) the relevant attributes about this calling identity for calling the target API.

Once the user attributes for the target API (e.g., App 2 API) are retrieved, the IAM system 102 filters the attributes based on an API specific profile (e.g., an API function profile) for the corresponding application function associated with the target API to generate a target API specific user profile (e.g., a target API profile) for the user of the calling application (e.g., App 1). The target API profile is used to calculate/execute corresponding authorization policies based on the attributes present in the target API profile, such that a suitable authorization token is generated to authorize only the application function associated with the target API for the calling application/user. The suitable authorization token is provided to the calling application (e.g., App 1), which will include the authorization token (or authorization token information) in the API request 700 at the time of invocation, and the target API may use the authorization token (or authorization token information) to provide a suitable response according to the calling application/user's identified authorizations.

In some embodiments, the IAM system 102 may further include, or may be communicably connected to, an API marketplace 702 to enable the application providers 122 to register APIs for the IAM system 102 to understand. In other words, the API marketplace 702 may be a kind of API directory for the IAM system 102, such that the IAM system 102 may provide appropriate authentication and authorization services for the registered APIs. While the figures show the API marketplace 702 as being separate from (e.g., implemented on a separate processor and/or memory from that of) the IAM system 102, the present disclosure is not limited thereto. For example, in other embodiments, the API marketplace 702 may be part of (e.g., implemented on the same processor(s) and/or memory as those of) the IAM system 102, may be distributed from among one or more processors and/or memories of the IAM system 102, or may be implemented separately from and communicably connected to (e.g., via a LAN, a WAN, the Internet, a cellular network, and/or the like) the IAM system 102. In some embodiments, the API marketplace 702 may be the API service for a small company and/or the like (e.g., the API service of the target application or the like).

The application providers 122 may communicate with (e.g., via a communication interface, an application interface, and the like) the API marketplace 702 to register various APIs, and may define the application functions associated with each of the registered APIs and their corresponding access boundaries based on, for example, business roles, business policies, AD groups, mappings, functions, and/or the like. Thus, when a calling application requests an authorization token for a corresponding application function of a target API, the IAM system 102 may use the registered information of the target API to generate a suitable authorization token to be included in the API request 700 to the target API, such that the target API may authorize only the corresponding application function for the calling application/user based on the attributes in the authorization token.

For example, the application providers 122 may provide, via the API marketplace 702, various API requirements, such as the API structure (e.g., formatting and input requirements for the APIs), the associated API application functions (e.g., the app functions 244), and corresponding application requirements (e.g., the app requirements 245), such that the IAM system 102 may use the API requirements to generate a suitable authorization token that may be understood by a corresponding target API to provide suitable access to a corresponding application function. Similar to the app functions 244 described above, the associated API application functions may correspond to one or more functions of an application that may be provided based on the permissions and access levels of a user, but limited to only those allowed by a corresponding target API. The corresponding application requirements may be the same or substantially the same as (or similar to) the app requirements 245 described above, except that they define the expected inputs (e.g., user attributes) and formatting requirements of an authorization token for the target API to enable only one or more of the associated API application functions.

In some embodiments, the application providers 122 may also register, in the API marketplace 702, the APIs (e.g., calling APIs) that their corresponding applications use to invoke a target API. For example, various calling APIs may be registered to define the target APIs invoked by the calling APIs, as well as how the corresponding API calls are structured when invoking a specific one of the associated API application functions of the target API. For example, an API request having a call type formatted as a GET request may correspond to a READ function of a corresponding target API, whereas an API request having a call type formatted as a POST request may correspond to a WRITE function of a corresponding target API. Accordingly, the calling APIs may be registered in the API marketplace 702, such that the IAM system 102 may determine the intent of the user with respect to a specific application function associated with a target API based on the call type of the API request 702 (e.g., GET, POST, PUT, DELETE, and the like).

Accordingly, in some embodiments, the application providers 122 of the calling applications may also register the calling APIs into the API marketplace 702, such that the IAM system 102 may identify a corresponding target API and a specific application function of the target API called by the calling API. In some embodiments, calling applications may also register APIs to allow application functions of the calling applications to be called by the IAM system 102 and/or other applications as needed or desired, and various suitable modifications may be possible as would be understood by those having ordinary skill in the art.

Figure 8:
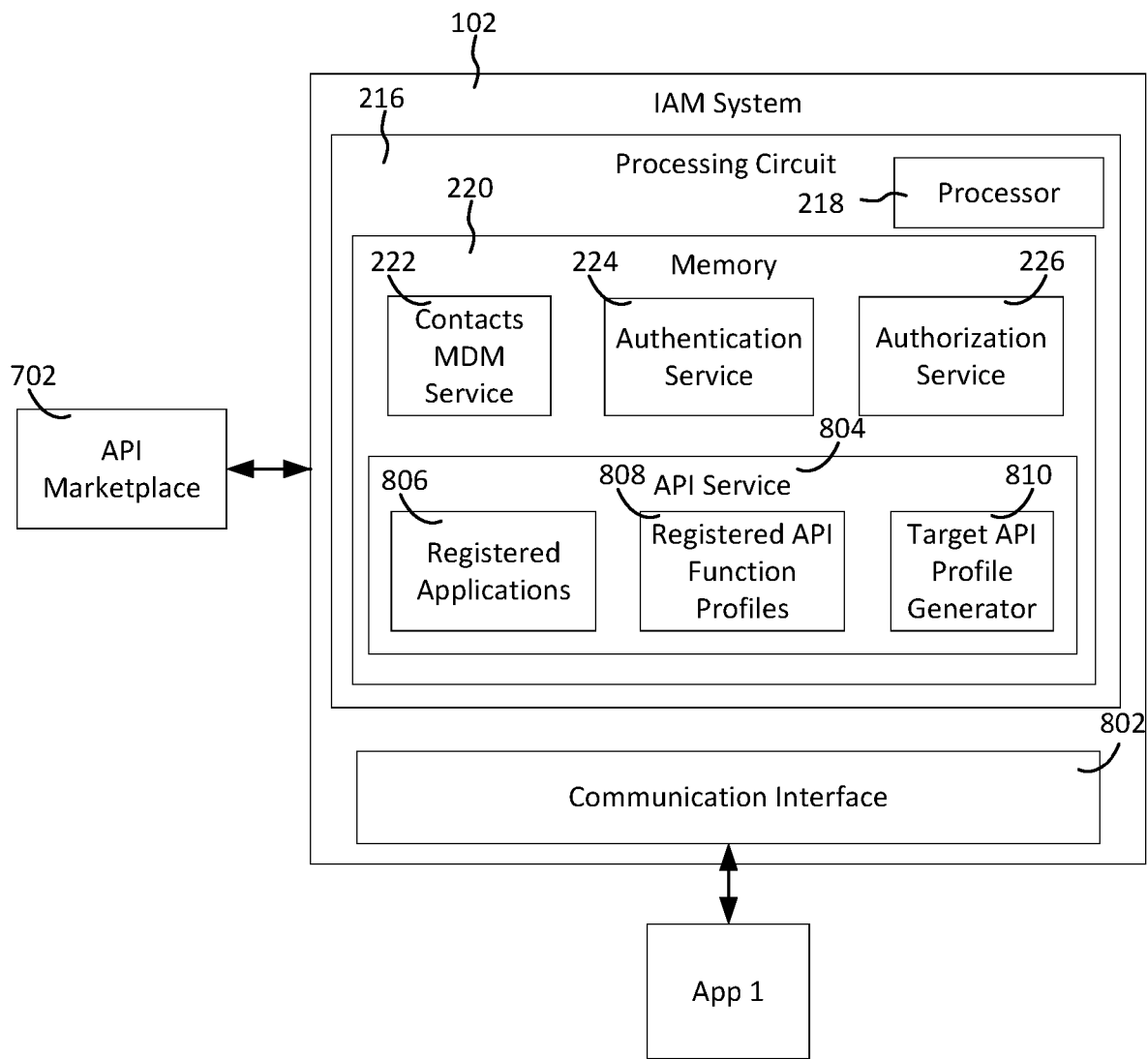
FIG. 8 illustrates an identity and access management system according to one or more embodiments of the present disclosure.

FIG. 8 illustrates an identity and access management system according to one or more embodiments of the present disclosure. In FIG. 8, the same or substantially the same elements as those described above may be denoted with the same reference symbols, and thus, redundant description thereof may not be repeated.

Referring to FIG. 8, in some embodiments, the IAM system 102 may be communicably connected to a calling application (e.g., App 1), for example, via the user device 104 (e.g., see FIG. 7). For example, in some embodiments, the IAM system 102 may include a communication interface 802 for communicating with the calling application App 1 (e.g., via the user device 104). The communication interface 802 may be a separate interface from those of the application interface 212 and the secured interface 214 (e.g., see FIG. 2), or at least two from among the communication interface 802, the application interface 212, and the secured interface 214 may be part of the same interface.

For example, the communication interface 802 may be or include wired or wireless communications interfaces (e.g., jacks, antennas, transmitters, receivers, transceivers, wire terminals, and/or the like) for conducting data communications with the IAM system 102. In various embodiments, communications via the interface 802 can be direct (e.g., local wired or wireless communications) or via the network 106 (e.g., see FIG. 1). For example, the interface 802 may include a Wi-Fi transceiver for communicating via a wireless communications network. In another example, the interface 802 may include an Ethernet card and port for sending and receiving data via an Ethernet-based communications link or network. In another example, the interface 802 may include cellular or mobile phone communications transceivers. In various embodiments, the interface 802 may support various protocols (e.g., TCP/IP, User Datagram Protocol UDP, Hypertext Transfer Protocol HTTP, Internet Message Access Protocol IMAP, Simple Mail Transfer Protocol SMTP, and/or the like) and/or data communication interfaces (e.g., APIs, Web Services, and/or the like) for facilitating data communications with the applications (e.g., the user device 104 and/or the application providers 122).

In some embodiments, the calling application (e.g., App 1) may be communicably connected to the IAM system 102 (e.g., via the communication interface 802) to request an authorization token (or authorization token information) for an application function corresponding to a target API of another application (e.g., App 2). In other embodiments, the calling application (e.g., App 1) may communicate with the IAM system 102 via the identity providers 124 (e.g., see FIG. 1) to request the authorization token (or authorization token information) for the application function corresponding to a target API of another application (e.g., App 2), similar to a login request described above.

For example, in some embodiments, the calling application may provide a calling API and identity information (e.g., an identity token, a login token, an authorization token, and/or the like) in an API token request to the IAM system 102, such that the IAM system 102 may generate a suitable authorization token to enable the corresponding application function of the target API called by the calling application. The IAM system 102 may provide the generated authorization token (or authorization token information) to the calling application, and the calling application may transmit an API request (e.g., the API request 700 shown in FIG. 7) to the target API. The API request may include the authorization token (or authorization token information) generated by the IAM system 102, such that the target API may provide access to only one or more corresponding application functions to the calling application based on the authorization token (or authorization token information).

For example, as shown in FIG. 8, in some embodiments, the memory 220 may further include an API service 804, in addition to the contacts MDM service 222, the authentication service 224, and the authorization service 226. Services 222, 224, 226, and 804 may be configured to receive inputs from the application providers 122, the identity providers 124, the calling applications (e.g., App 1), and other data sources (e.g., other enterprise systems and subsystems), determine actions for the IAM system 102 based on the inputs, generate control signals based on the actions, and provide the generated control signals to the interfaces 212, 214, and 802 for communicating with the application providers 122, the identity providers 124, and the calling applications. The contacts MDM service 222, the authentication service 224, and the authorization service 226 may be the same or substantially the same as (or similar to) those described above with reference to FIG. 2, and thus, redundant description thereof may not be repeated.

While FIG. 8 shows that each of the contacts MDM service 222, the authentication service 224, the authorization service 226, and the API service 804 are part of the same processing circuit 216, the present disclosure is not limited thereto. For example, each of the services 222, 224, 226, and 804 may be implemented on one or more internal processing circuits with respect to the IAM system 102 or may be implemented on one or more external processing circuits as part of a cloud-based computing system. Further, while FIG. 8 shows the API service 804 as a separate service from those of the authentication service 224 and the authorization service 226 for convenience of illustration, it should be appreciated that the API service 804 (or a suitable part thereof) may be part of the authentication service 224 and/or the authorization service 226, in some embodiments.

In brief overview, the API service 804 may register applications that utilize one or more APIs registered in the API marketplace 702. The API service 804 may map each of the registered APIs in the API marketplace 702 to a corresponding application function, and may register an API function profile (e.g., generated by the authorization service 226) for a corresponding application function of each of the registered APIs. In response to an API token request, the API function profile may be used to filter the attributes (e.g., stored in the contacts MDM service 222) to generate a target API profile for a corresponding application function of a target API. The target API profile may include only those attributes needed by the target API to enable the corresponding application function for the user in the calling application, and may be used (e.g., by the authorization service 226) to execute one or more API authorization policies to generate a suitable authorization token to authorize only the corresponding application function by the target API.

For example, the API service 804 may receive the API token request (e.g., from the calling application or via the identity providers 124), and may identify the identity information and the calling API from the API token request. The API service 804 may determine whether the calling application is authorized to call a corresponding target API associated with the calling API. The API service 804 (or via the authentication service 224) may retrieve the attributes associated with the identity information from the contacts MDM service 222, and may filter the attributes based on an API function profile of a corresponding application function of the target API to generate a target API profile including only those attributes needed by the target API to enable the corresponding application function. The API service 804 may communicate with the authorization service 226 to execute one or more API authorization policies based on the target API profile to generate and provide a suitable authorization token to the calling application in response to the API token request. The calling application may include the authorization token (or authorization token information) in the API request to the target API to invoke the corresponding application function of the target application, such that the target API may provide a suitable response (e.g., access granted or denied) based on the attributes contained in the authorization token (or the authorization token information).

In more detail, in some embodiments, the API service 804 may include registered applications 806, registered API function profiles 808, and a target API profile generator 810. While FIG. 8 shows that the registered applications 806, the registered API function profiles 808, and the target API profile generator 810 are part of the API service 804, it should be appreciated that at least some of the registered applications 806, the registered API function profiles 808, and the target API profile generator 810 may be part of the API marketplace 702, the authentication service 224, and/or the authorization service 226, in some embodiments.

The registered applications 806 may be the front door for API governance and establishing authorization boundaries for managed and trusted applications (e.g., App1, App2, and the like). The registered applications 806 may include registration information associated with each of the applications (or the application providers 122) registered to utilize one or more APIs registered in the API marketplace 702. For example, each of the calling application (e.g., App 1) and the target application (e.g., App 2) may be registered with the registered applications 806. The registration information may include, for example, an application identifier, API permission information that the applications are allowed to call, mapping information of the registered APIs, and/or the like. The registration information may be used by the API service 804 to determine whether the calling application is authorized to call a particular target API, as well as the parts of authentication and authorization that are needed for the target API call.

The API service 804 may map each of the registered APIs to a corresponding task or application function. For example, when the registered API is a target API, the API service 804 may map the target API to a corresponding application function. When the registered API is a calling API, the calling API may be mapped to a corresponding target API, such that a corresponding application function mapped to the target API may be identified. The API service 804 may register, in the registered API function profiles 808, a corresponding API function profile for each of the registered APIs that defines all of the user and/or application attributes needed by a target API to enable a corresponding application function for a calling application. For example, the registered API function profiles 808 may include information corresponding to the various call types (e.g., GET, POST, and the like) corresponding to various application functions allowed by a target API, and how the call types of the API calls are mapped to the various application functions.

For example, in some embodiments, the API function profile may be generated by the authorization service 226 for a registered API based on the application functions and the API requirements for the registered API defined by the application providers 122, similar to the application profiles generated by the policy engines 242 as described above. However, unlike in the case of the application profiles described above, instead of enabling the various application functions of a corresponding application based on all of the various sets and combinations of user attribute types that may be present, the API function profile may define only those attributes that are used by a corresponding target API to enable the application function of the corresponding target API that the calling application is invoking.

The target API profile generator 810 may use the API function profile of a corresponding target API to filter the attributes (e.g., stored in the contacts MDM service 222) to generate a target API profile. For example, in some embodiments, in response to an API token request, the target API profile generator 810 may parse the identity information (e.g., the identity token) contained in the API token request. The target API profile generator 810 may query the contacts MDM service 222 (e.g., directly or via the authentication service 224) based on the identity information to retrieve the user attributes. The target API profile generator 810 may identify a target API mapped to the calling API in the API token request, and may identify an API function profile registered (e.g., in the registered API function profiles 808) for the application function associated with the identified target API to filter the attributes according to the API function profile registered for the identified target API. Thus, the target API profile may include only those relevant attributes needed to enable the corresponding application function by the target API. The target API profile may then be used (e.g., by the authorization service 226) to identify a corresponding API authorization policy to generate a suitable authorization token for enabling the corresponding application function by the target API.

In some embodiments, the authorization service 226 may generate the API authorization policies according to the associated API application functions and corresponding application requirements defined by the application providers 122 when registering the APIs, and may execute suitable ones of the API authorization policies to generate the authorization tokens according to the user attribute set of the user contained in the target API profile. For example, in some embodiments, the policy engines 242 of the authorization service 226 may generate various API authorization policies according to the associated API application functions and the corresponding application requirements defined by the application providers 122, and may generate a corresponding API function profile for each of the registered APIs to associate (e.g., to tie or to map) each of the API authorization policies to various expected user attributes that are used to execute a corresponding API authorization policy when generating the authorization token. The generated API function profiles may be registered in the registered API function profiles 808, and may be used by the target API profile generator 810 (or the authentication service 224) to filter the attributes for the identity information contained in an API request to generate a suitable target API profile.

For example, in some embodiments, the policy engines 242 may calculate/generate the API authorization policies for each of the registered APIs in order to generate a suitable authorization token for the user to access a particular application function enabled by the identified target API. The API authorization policies may be calculated/generated based on the associated API application functions and corresponding application requirements defined by the application providers 122, and the API authorization policies may be executed to generate the authorization token based on the particular user attributes and contact information of the user (e.g., the user attribute set) contained in the target API profile for the user. Like the authorization policies described above with reference to FIG. 3, the API authorization policies may be tiered, and/or each of the API authorization policies may be associated with a corresponding target API (or corresponding API application function), such that when the API token request is received, a suitable API authorization policy may be identified and executed to generate a suitable authorization token for the identified target API.

The associated API application functions may correspond to various functions of an application that may be enabled by the target APIs based on the permissions and access levels of a user, and the corresponding application requirements may define the expected inputs (e.g., the user attributes) and formatting requirements of the authorization token in order to enable the associated API application functions by the target APIs. Thus, the associated API application functions may define the access boundaries of the application that may be accessed via the target APIs, and the corresponding application requirements may define the particular business roles, business goals, business policies, mappings, and/or the like that are used by the target APIs to provide the permissions and access levels necessary to access a particular API application function of a corresponding application.

Accordingly, when an API token request is received, the target API profile generator 810 (or the authentication service 224) may use the API function profile for the identified target API to generate the target API profile by filtering the user attributes of the user stored in the contacts MDM service 222 according to the user attribute types used by the identified target API to provide access to the corresponding application function. The target API profile may include only those user attributes (e.g., user attribute set) of the user that are relevant to the target API in determining whether the calling application/user should be granted access to the associated API application function(s). The target API profile generator 810 (or the authentication service 224) may provide the target API profile to the authorization service 226 to select and execute one or more corresponding API authorization policies to generate a suitable authorization token according to the user attribute set in the target API profile. The generated authorization token may be provided to the calling application in response to the API token request, and the calling application may include the authorization token in the API request to the target API, such that the target API may enable the corresponding application function for the calling application/user according to the authorization token.

Figure 9:
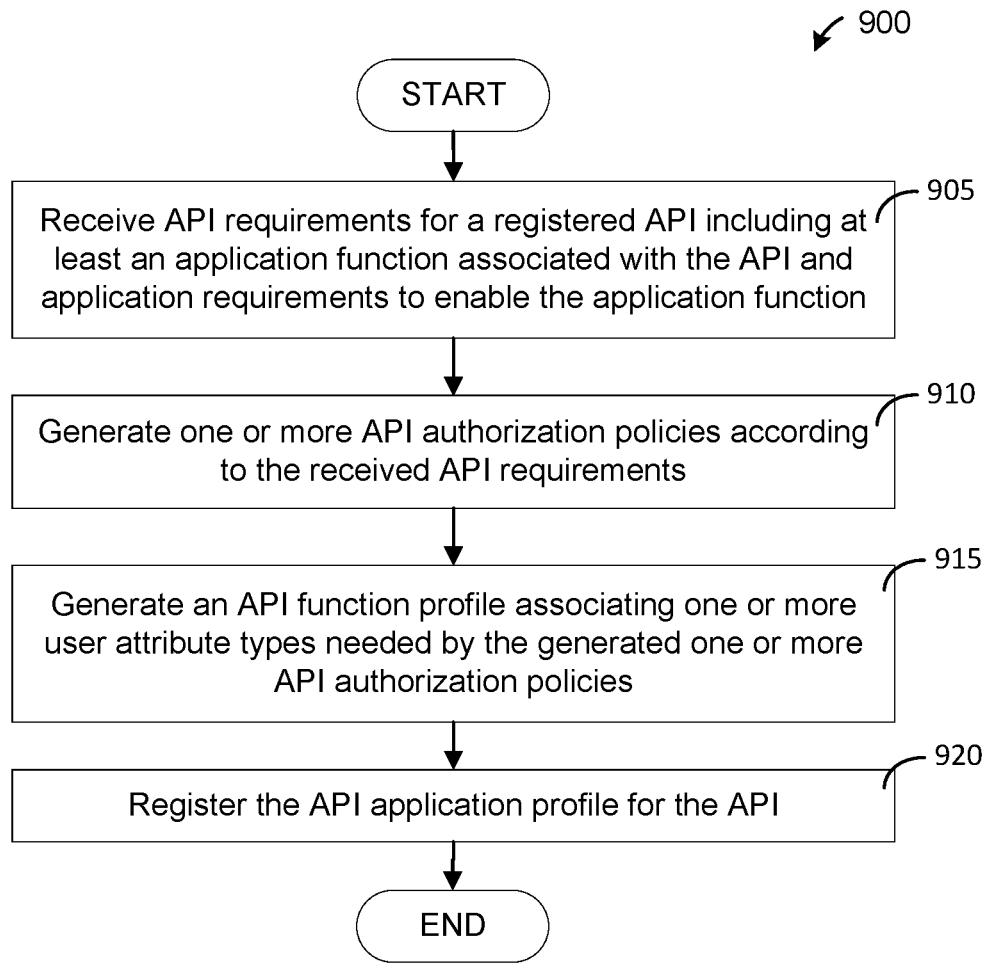
FIG. 9 is a flowchart of a method of generating API authorization policies according to one or more embodiments of the present disclosure.

FIG. 9 is a flowchart of a method of generating API authorization policies according to one or more embodiments of the present disclosure. For example, the method 900 may be performed by the authorization service 226 (e.g., the policy engines 242) as described above. However, the present disclosure is not limited thereto, and the operations shown in the method 900 may be performed by any suitable one of the components and elements or any suitable combination of the components and elements of those of one or more example embodiments described above. Further, the present disclosure is not limited to the sequence or number of the operations of the method 900 shown in FIG. 9, and can be altered into any desired sequence or number of operations as recognized by a person having ordinary skill in the art. For example, in some embodiments, the order may vary, or the method 900 may include fewer or additional operations.

Referring to FIG. 9, the method 900 may start, and API requirements for a registered API may be received at block 905, including at least an application function associated with the API and application requirements to enable the application function. For example, the application provider 122 of a target API (e.g., App 2 API) may communicate with the IAM system 102 via the API marketplace 702 to define the API requirements of the target API, which is registered in the API marketplace 702. The API requirements may include at least the application function (e.g., the associated API application function) and its access boundaries, as well as the application requirements (e.g., the corresponding formatting and input requirements) of an authorization token that may be understood by the target API to enable the application function for a calling application/user. For example, the application requirements may identify the expected user attributes for the target API to enable the application function of the application for the calling application/user, as well as the formatting requirements of the authorization token to include the expected user attributes in a format that may be used by the application to provide suitable access, via the target API, to the application function of the application for a calling application/user. In some embodiments, the API requirements may further include the API structure (e.g., formatting and input requirements for the API) in order for the IAM system 102 to understand how an API request may be constructed to include the information (e.g., the authorization token or the authorization token information) needed by the target API in a suitable format in the API request to enable the corresponding application function for the calling application/user.

One or more API authorization policies may be generated according to the received API requirements at block 910. For example, in some embodiments, the authorization service 226 (e.g., the logic policy engine 302) may generate one or more API authorization policies based on at least the application function and the application requirements. The API authorization policies, when executed, may generate a suitable authorization token for the target API to enable the application function for the calling application/user when authorized.

An API application function profile (e.g., an API function profile) associating one or more user attribute types needed by the one or more API authorization policies may be generated at block 915. For example, the API function profile may define all of the user attribute types needed by the generated one or more API authorization policies in order to generate the authorization token for the target API. The API function profile may be used to filter the user attributes stored by the contacts MDM service 222 to include only those attributes needed to execute the one or more authorization policies associated with the API function profile in order to generate the authorization token for the target API. Accordingly, the API function profile for the API may be generated by the authorization service 226 to map the API authorization policies to certain user attributes defined by the application requirements, and the API function profile may be used (e.g., by the authentication service 224 or the target API profile generator 810) to filter all of the attributes of a calling application/user stored by the contacts MDM service 222 to include only the attributes (e.g., in a target API profile) relevant to the target API to provide access to the corresponding application function of the corresponding application to the calling application/user.

The application profile for the API may be registered at block 920, and the method 900 may end. For example, the API function profile may be registered by or with the API service 804 (e.g., in the registered API function profiles 808) and associated with the registered API. As discussed in more detail below, in response to an API token request, the API function profile may be used (e.g., by the target API profile generator 810 and/or the authentication service 224) to filter the attributes of the identity information for the calling application/user stored in the contacts MDM service 222, such that the filtered attributes (e.g., in the corresponding target API profile) may be used to execute only the one or more API authorization policies associated with the API function profile in order to generate an authorization token that only authorizes the corresponding application function by the target API.

Figure 10:
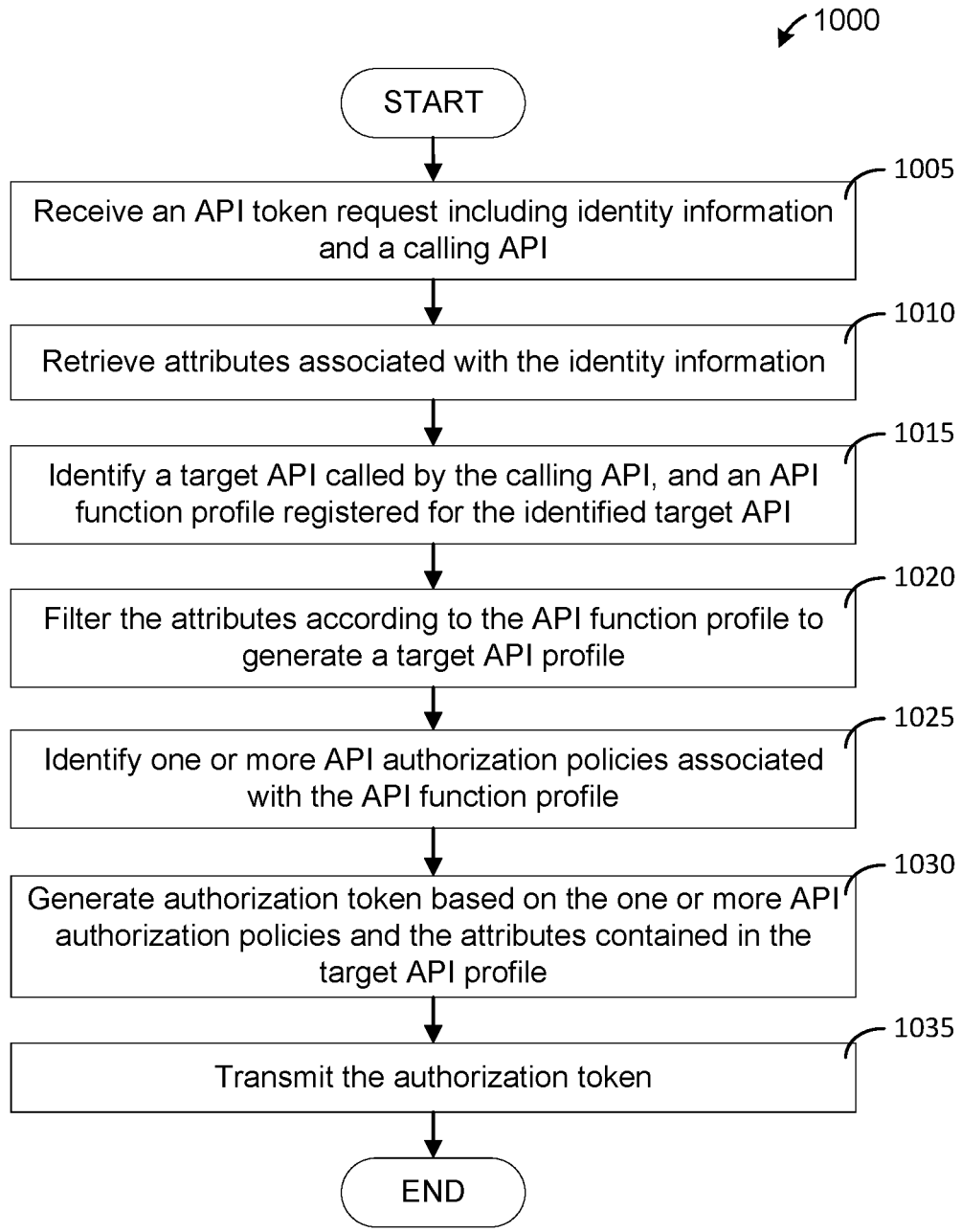
FIG. 10 is a flowchart of a method of generating an authorization token in response to an API token request according to one or more embodiments of the present disclosure.

FIG. 10 is a flowchart of a method of generating an authorization token in response to an API token request according to one or more embodiments of the present disclosure. For example, the method 1000 may be performed by the IAM system 102 (e.g., the authentication service 224, the authorization service 226, and/or the API service 804) described above. However, the present disclosure is not limited thereto, and the operations shown in the method 1000 may be performed by any suitable one of the components and elements or any suitable combination of the components and elements of those of one or more example embodiments described above. Further, the present disclosure is not limited to the sequence or number of operations of the method 1000 shown in FIG. 10, and can be altered into any desired sequence or number of operations as recognized by a person having ordinary skill in the art. For example, in some embodiments, the order may vary, or the method 1000 may include fewer or additional operations.

Referring to FIG. 10, the method 1000 may start, and an API token request including identity information and a calling API may be received at block 1005. For example, in some embodiments, the API service 804 (e.g., the target API profile generator 810) and/or the authentication service 224 may receive the API token request from a calling application (e.g., App 1), or via an identity provider 124 communicably connected to the calling application. The identity information may include an identity token including, for example, an authentication mechanism used to identify the user, group information (e.g., AD group information) that the user is associated with, and/or the like.

User attributes associated with the identity information may be retrieved at block 1010. For example, in some embodiments, the target API profile generator 810 (or the authentication service 224) may query the contacts MDM service 222 according to the identity information contained in the API token request to identify all of the attributes associated with the calling application/user. These attributes may then be filtered according to an API function profile of a target API to generate a corresponding target API profile (e.g., see block 1020). For example, in some embodiments, the target API called by the calling API may be identified, and a corresponding API function profile registered (e.g., in the registered API function profiles 808) for the identified target API may be identified at block 1015.

Accordingly, the attributes (e.g., retrieved at block 1010) may be filtered according to the API function profile to generate a target API profile at block 1020. For example, the target API profile generator 810 (or the authentication service 224) may retrieve the corresponding API function profile (e.g., from the registered API function profiles 808), and may filter the attributes retrieved from the contacts MDM service 222 to generate the target API profile including only the attributes needed to enable the corresponding application function by the target API, and may provide the target API profile to the authorization service 226 to generate a suitable authorization token for the target API.

One or more API authorization policies associated with the API function profile may be identified at block 1025. For example, in some embodiments, the target API profile generator 810 (or the authentication service 224) may provide the target API profile to the authorization service 226, and the authorization service 226 may identify (e.g., based on the corresponding target API profile or the corresponding API function profile), one or more API authorization policies to calculate/execute in order to generate the suitable authorization token to enable the corresponding application function by the target API.

In some embodiments, the one or more API authorization policies may then be used to determine whether the authentication mechanism used to authenticate the calling application/user is sufficient to grant access to the associated application function, similarly to blocks 620 through 630 described above with reference to FIG. 6, such that a new identity token may be requested (e.g., from the identity providers 124) based on a different authentication mechanism used, but the present disclosure is not limited thereto.

An authorization token may be generated based on the one or more API authorization policies and the attributes contained in the target API profile at block 1030. The authorization token may be transmitted at block 1035, and the method 1000 may end. For example, in some embodiments, the authorization service 226 (or the API service 804) may transmit the authorization token to the calling application (or via the identity provider 124), and the calling application may include the authorization token in the API request to the target API, such that the target API may provide authorization to the corresponding application function according to the attributes contained in the authorization token. Accordingly, the calling application (e.g., App 1) may be provided access to only the application function of the target application (e.g., App 2) corresponding to the target API (e.g., App 2 API) based on the information (e.g., the attributes) contained in the authorization token, irrespective of the user's other permissions and access levels within the target application.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

When a certain embodiment may be implemented differently, a specific process order may be different from the described order. For example, two consecutively described processes may be performed at the same or substantially at the same time, or may be performed in an order opposite to the described order.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. An identity and access management system comprising:
    at least one processor; and
    memory comprising instructions that, when executed by the at least one processor, cause the processor to:
    receive an application programming interface (API) token request for an authorization token to authorize an application function associated with a target API of an application;
    determine identity information from the API token request;
    retrieve attributes associated with the identity information;
    identify the target API and an API function profile associated with the target API for the application function;
    filter the attributes associated with the identity information based on the API function profile;
    generate the authorization token according to the filtered attributes;
    transmit the authorization token in response to the API token request;
    identify one or more API authorization policies based on the API function profile, wherein the API authorization policies enable only the application function associated with the target API from among a plurality of application functions associated with the application of the target API;
    execute the one or more API authorization policies based on the filtered attributes to generate the authorization token;
    receive API requirements registered in an API marketplace for the target API, the API requirements including at least the application function associated with the target API and application requirements for the authorization token to enable the application function by the target API;
    generate the API authorization policies based on the application function and the application requirements;
    generate the API function profile for the target API based on the API authorization polices; and
    associate the API function profile with the target API.

2. The system of claim 1, wherein the attributes are retrieved from a master data management store configured to store various attributes of various applications and users.

3. The system of claim 1, wherein the API function profile includes a plurality of attribute types to be included in the authorization token generated for the target API.

4. The system of claim 1, wherein the authorization token enables only the application function associated with the target API from among a plurality of application functions associated with the application of the target API.

5. A method, comprising:
receiving an application programming interface (API) token request for an authorization token to authorize an application function associated with a target API of an application;
determining identity information from the API token request;
retrieving attributes associated with the identity information;
identifying the target API and an API function profile associated with the target API for the application function;
filtering the attributes associated with the identity information based on the API function profile;
generating the authorization token according to the filtered attributes;
transmitting the authorization token in response to the API token request;
identifying one or more API authorization policies based on the API function profile, wherein the API authorization policies enable only the application function associated with the target API from among a plurality of application functions associated with the application of the target API;
executing the one or more API authorization policies based on the filtered attributes to generate the authorization token;
receiving API requirements registered in an API marketplace for the target API, the API requirements including at least the application function associated with the target API and application requirements for the authorization token to enable the application function by the target API;
generating the API authorization policies based on the application function and the application requirements;
generating the API function profile for the target API based on the API authorization polices; and
associating the API function profile with the target API.

6. The method of claim 5, wherein the attributes are retrieved from a master data management store configured to store various attributes of various applications and users.

7. The method of claim 5, wherein the API function profile includes a plurality of attribute types to be included in the authorization token generated for the target API.

8. The method of claim 5, wherein the authorization token enables only the application function associated with the target API from among a plurality of application functions associated with the application of the target API.

9. An identity and access management system comprising:
at least one processor; and
memory comprising instructions that, when executed by the at least one processor, cause the processor to:
receive an application programming interface (API) token request for an authorization token to authorize an application function associated with a target API of an application;
receive API requirements registered in an API marketplace for the target API, the API requirements including at least the application function associated with the target API and application requirements for the authorization token to enable the application function by the target API;
determine identity information from the API token request;
retrieve attributes associated with the identity information;
identify the target API and an API function profile associated with the target API for the application function;
filter the attributes associated with the identity information based on the API function profile;
generate the authorization token according to the filtered attributes; and
transmit the authorization token in response to the API token request.

10. The system of claim 9, wherein the attributes are retrieved from a master data management store configured to store various attributes of various applications and users.

11. The system of claim 9, wherein the instructions further cause the at least one processor to:
identify one or more API authorization policies based on the API function profile; and
execute the one or more API authorization policies based on the filtered attributes to generate the authorization token.

12. The system of claim 11, wherein the API authorization policies enable only the application function associated with the target API from among a plurality of application functions associated with the application of the target API.

13. The system of claim 12, wherein the instructions further cause the at least one processor to:
generate the API authorization policies based on the application function and the application requirements;
generate the API function profile for the target API based on the API authorization polices; and
associate the API function profile with the target API.

14. The system of claim 13, wherein the API function profile includes a plurality of attribute types to be included in the authorization token generated for the target API.

* * * * *